US008567308B2

(12) United States Patent
Onozato et al.

(10) Patent No.: US 8,567,308 B2
(45) Date of Patent: Oct. 29, 2013

(54) SPIRAL TRANSFER HEAT TREATMENT APPARATUS

(75) Inventors: Masayuki Onozato, Tokyo (JP); Hideki Miyanishi, Tokyo (JP); Norio Ishiwata, Tokyo (JP); Shigeru Takahashi, Tokyo (JP); Akira Taniyama, Tokyo (JP); Takahiro Arai, Tokyo (JP); Akira Sekino, Tokyo (JP)

(73) Assignee: Mayekawa Mfg. Co., Ltd (JP)

( * ) Notice: Subject to any disclaimer, the term of this patent is extended or adjusted under 35 U.S.C. 154(b) by 694 days.

(21) Appl. No.: 12/578,267

(22) Filed: Oct. 13, 2009

(65) Prior Publication Data

US 2010/0147161 A1 Jun. 17, 2010

Related U.S. Application Data

(63) Continuation of application No. PCT/JP2008/057094, filed on Apr. 10, 2008.

(30) Foreign Application Priority Data

Apr. 11, 2007 (JP) ................................. 2007-103673

(51) Int. Cl.
*A21B 1/08* (2006.01)
(52) U.S. Cl.
USPC .............................. 99/478; 99/477; 99/443 C
(58) Field of Classification Search
USPC ................. 99/477, 478, 479, 443 C
See application file for complete search history.

(56) References Cited

U.S. PATENT DOCUMENTS 4,480,535 A 11/1984 Jaxmar et al.
4,631,029 A * 12/1986 Lanham et al. ............... 432/133

(Continued)

FOREIGN PATENT DOCUMENTS

JP 61-200808 U 12/1986
JP 2-64863 U 5/1990

(Continued)

OTHER PUBLICATIONS

Japanese Office Action for corresponding JP 2007-509373, Issue Date May 11, 2012. English translation provided.

(Continued)

*Primary Examiner* — Reginald L Alexander
(74) *Attorney, Agent, or Firm* — Rossi, Kimms & McDowell LLP

(57) ABSTRACT

In a food transfer heat treatment apparatus using a spiral transfer belt, heat treatment gas blowing means and a heat treatment gas circulating method for enhancing the heat transfer efficiency between a heat treatment gas and food and for improving the heat treatment effect are realized to expand the degree of freedom for the layout of the apparatus and to simplify the assembly. Provided is a spiral transfer heat treatment apparatus comprising endless conveyer belts (2) for circulating the food (f) in a store room (1), and a spiral moving unit (3) for causing a heat treatment gas (c) to act on the food (f) while transferring the food (f) on the conveyer belts (2). The spiral transfer heat treatment apparatus further comprises a heat treatment gas generating device (10) arranged in the inside space of the spiral moving unit (3), a distribution duct (13) arranged between the heat treatment gas generating device (10) and the spiral moving unit (3) for receiving the heat treatment gas (c) generated in the heat treatment gas generating device (10), and a plurality of hollow nozzle units (14) protruding from the distribution duct (13) between the conveyer belts (2) of the spiral moving unit (3), thereby to inject the heat treatment gas flow toward the food (f) on the conveyer belts (2) arranged below and to form their upper faces (14c) into the supporting faces of rails (15) for supporting the conveyer belts (2) slidably.

11 Claims, 12 Drawing Sheets

Enlargement of part B

(56) References Cited

U.S. PATENT DOCUMENTS

| | | | | |
|---|---|---|---|---|
| 5,205,135 | A | * | 4/1993 | Lang ............................... 62/381 |
| 5,850,781 | A | * | 12/1998 | Kuenen ...................... 99/443 C |
| 6,418,834 | B1 | * | 7/2002 | Perrine .......................... 99/334 |
| 7,107,899 | B2 | * | 9/2006 | Nothum, Jr. ................. 99/443 C |

FOREIGN PATENT DOCUMENTS

| | | | |
|---|---|---|---|
| JP | 5132115 | A | 5/1993 |
| JP | 7081728 | A | 3/1995 |
| JP | 8-313140 | A | 11/1996 |
| JP | 10157820 | | 6/1998 |
| JP | 2000-074540 | A | 3/2000 |
| JP | 2000297977 | A | 10/2000 |
| JP | 2002-068436 | A | 3/2002 |
| JP | 2002130901 | A | 5/2002 |
| JP | 2008-56489 | A | 3/2008 |

OTHER PUBLICATIONS

ISR issued Jul. 22, 2008 for PCT/JP2008/057094.

* cited by examiner

A-A cross section

Enlargement of part B

C-C cross section

SPIRAL TRANSFER HEAT TREATMENT APPARATUS

CROSS REFERENCE TO RELATED APPLICATION

This is a continuation of International Application PCT/JP2008/057094 (published as WO 2008/126900) having an international filing date of 10 Apr. 2008, which claims priority to JP 2007-103673 filed on 11 Apr. 2007. The disclosures of the PCT application and the priority application, in their entity, including the drawings, claims, and the specifications thereof, are incorporated herein by reference.

FIELD OF THE INVENTION

The present invention relates to a spiral heat transfer treatment apparatus that includes an endless transfer belt arranged spirally in a storeroom space where food conveyed on the surface of the transfer belt is heat-treated, namely, the food is cooled, frozen, heated, dried, or steamed, by blowing heat treatment gas such as cool air, warm air or hot air, against the food, while the transfer belt is being set in motion.

BACKGROUND OF THE INVENTION

Conventionally, there has been developed what they call a spiral freezer that is a food transfer heat treatment apparatus in which an endless transfer belt is spirally arranged in a storeroom, the food on the transfer belt is heat-treated, for instance, the food is cooled or frozen while being spirally conveyed together with the transfer belt in the storeroom.

The patent reference 1 (JP1995-81728) discloses an example of the food transfer heat treatment apparatus in which an endless transfer belt is spirally moved around a rotating drum that is vertically installed in a storeroom and is rotated around the center axis thereof, while the transfer belt is set in a spiral motion, by the rotation of the drum, along a spiral route around the outer periphery of the drum; and the food on the endless transfer belt is heat-treated for instance, the food is frozen. In addition, the an upper axis end of the rotating drum that is vertically arranged is suspended so as to be supported by the ceiling of the storeroom, as a cantilever is suspended from a ceiling and the top part of the cantilever is supported at a point on the ceiling. Thus, the rotating drum is suspended from the ceiling and the upper axis end part of the drum is rotatably connected to a drum driving means provided on the ceiling outside.

Thus, the disclosure of the patent reference 1 aims at ensuring a sufficient space between the lower end of the drum and the floor of the storeroom so that the floor cleaning can be easier, the heat generated by the drum driving means can be prevented from transferring into the storeroom, and the loss of the refrigerating power can be reduced.

Further, the patent reference 2 (JP2002-68436) discloses a food transfer and heat-treatment apparatus in which a heat-treatment-air generating device is arranged inside the space that is surrounded by the spiral transfer belt on which the food is placed and spirally conveyed. According to this disclosure, the space occupied by the apparatus can be remarkably reduced in comparison with the space occupied by a prior apparatus in which the space of the spirally conveyed belt and the space of the heat-treatment-air generating device are juxtaposed. Thus, the storeroom can be compact. Further, the heat-treatment-air streams vertically in the storeroom so that the travel distance of the heat-treatment air to the space of the spirally conveyed belt from the air blown-off place is reduced; as a result, the thermal efficiency is enhanced.

Further, the patent reference 3 (JP1998-157820) discloses a food transfer and heat-treatment apparatus in which the rotating drum of a cylindrical shape as is used in the patent reference 1 or 2 is not provided, and the food transfer and heat-treatment apparatus of the reference 3 is provided with a driving means for driving an endless spiral conveyer belt outside thereof.

According to this apparatus of the reference 3, inside the spiral conveyer belt can be arranged, a heat-treatment-air generating device that generates the air by which the food is frozen or heated. Thus, the footprint of the food transfer and heat-treatment apparatus can be reduced.

The patent reference 4 (JP1993-132115) and FIG. 1 thereof disclose a spiral conveyer (belt) in which;
- an upward spiral conveyer route and an downward spiral conveyer route are provided so that both of the routes form an endless transfer belt (route);
- the upward conveyer route is reversed into the downward conveyer route at a conveyer route of a S-shaped route (a S-shaped reverse route); and
- the upward spiral route and the downward spiral route are repeated in turn along the vertical direction so that both routes form a laminated configuration in which the upward layer and the downward layer appear in turn.

The patent reference 5 (JP2008-56489) is hereby explained on for reference although the reference 5 is disclosed after the priority date of the present invention; the reference 5 discloses a concrete configuration as to a belt of a chain conveyer. In consultation with FIGS. 15 and 16 of this application, the configuration of the chain conveyer belt is reviewed. As shown in FIG. 15, the conveyer belt 110 includes a series of adjacent links 111, and a lateral member 112 that is also referred to as a containment sidewall whereby the lateral member (a lateral plate) is placed at each left or right side of the plane (surface) of the belt, so that the lateral member is installed upright to the belt plane.

As shown in FIG. 16, each link 111 includes a U-shaped body part 121; thereby, at an end side of the U-shaped body part 121, an appendage part 122 is formed, the part 122 protruding toward the outside of the conveyer belt plane. Further, the U-shaped body part 121 comprises a pair of slots 123, and a pair of holes 124.

As shown in FIG. 15, the conveyer belt 110 comprises a plurality of conveyer rods 113 that forms the conveyer belt plane, the left end of each rod 113 is inserted into the holes 124 of a left side link 111 as well as into the slots 123 of an adjacent left side link 111; the right end of each rod 113 is inserted into the holes 124 of a right side link 111 as well as into the slots 123 of an adjacent right side link 111; and, both the ends of a conveyer rod 113 is locked to the holes 124 of a link; thus, each adjacent pair of links are connected to each other.

A tooth 114a of a cogged wheel 114 meshes with an appendage part 122 of a link 111. Thus, the drive power is transmitted to the conveyer belt 110 from the cogged wheel. Further, since the conveyer rod 113 can slide in the slots 123, the conveyer belt 110 can travel in a curved route while cornering left or right.

According to the disclosures of the references 1 and 2, there is, however, a difficulty in ensuring a sufficient space inside the spiral route of the conveyer belt, since the rotating drum that drives the conveyer belt is arranged inside the spiral route. Although the patent reference 2 discloses a configuration in which a heat-treatment-air generating device is arranged inside the limited space that the spiral route of the conveyer belt surrounds, the limited space is too small to freely arrange the heat-treatment-air generating device therein.

Further, in the technologies according to the references 1 and 2, the drive power as to the spiral conveyer (transfer) belt consists of the torque of the rotating drum, and the pulling power of the pulling device for the conveyer belt. An example of the pulling device for the conveyer belt may be a drive sprocket that makes the conveyer belt move by meshing mechanically with the conveyer belt. Since the pulling power is derived from a remarkable pulling force, the pulling power has to be great; therefore, the sum of the pulling power as to the conveyer belt and the drive power as to the heavy rotating drum becomes further greater. In other words, the drive energy saving as well as the space saving cannot be achieved so long as the rotating drum is used.

According to the technology disclosed by the patent reference 3, the drive mechanism for driving the spiral conveyer belt is separated without a rotating drum, so that the driving power can be saved. However, regarding the improvement means for improving the heat-treatment performance as to the heat-treatment-air, the disclosure by the reference 3 is limited within only an idea that the heat-treatment-gas can act on the subject products radially with an angle of radiation up to 360 degrees, from a point inside the spiral conveyer route. A further concrete configuration is not shown in the patent reference 3.

The patent reference 4 discloses a configuration as to the above-described spiral conveyer route. However, nothing is disclosed about a concrete means or configuration regarding the heat-treatment-air blowing against the transferred products conveyed by the spiral conveyer belt. Neither is disclosed any means or configuration regarding the construction simplification as well as the layout flexibility (allowable space) in constructing the spiral freezer.

The patent references quoted above are as follows:
Patent Reference 1 JP1995-81728;
Patent Reference 2 JP2002-68436;
Patent Reference 3 JP1998-157820;
Patent Reference 4 JP1993-132115;
Patent Reference 5 JP2008-56489.

SUMMARY OF THE INVENTION

In view of the above-stated conventional technologies and anticipated solutions thereof, the present disclosure aims at providing a food transfer heat-treatment apparatus which can enhance the efficiency of the heat exchange between the food and the heat-treatment-gas, and a method for blowing the heat-treatment-gas as well as for circulating the heat-treatment-gas is provided so as to improve the heat-treatment performance.

Further, the present disclosure aims at increasing the layout flexibility, simplifying the construction, and saving the driving power as to the food transfer heat-treatment apparatus.
(The First Invention)
In order to achieve the above objective, the present invention discloses, as a first invention, a spiral transfer heat-treatment apparatus, comprising:
a spiral transfer route formed in a storeroom so that food is heat-treated by heat-treatment-gas while transferring the food;
a heat-treatment-gas generating device that is placed in a space inside the spiral transfer route;
at least one distribution duct that is placed between the heat-treatment-gas generating device and the spiral transfer route, the duct inhaling the heat-treatment gas generated by the heat-treatment-gas generating device:
wherein the spiral transfer route includes;
an endless transfer belt on which food is transferred, and
a plurality of hollow nozzles that protrude from the distribution duct toward spaces between vertically successive loops of the endless transfer belt and support at least two rails, on which the transfer belt slides to move, with the upper surface of the hollow nozzles, the hollow nozzles ejecting the heat-treatment-gas toward the food transferred on the belt below the hollow nozzle.

According to the above first invention, the heat-treatment-gas generated by the heat-treatment-gas generating device is inhaled into the hollow nozzle through the distribution duct that is placed around the heat-treatment-gas generating device. Then, the heat-treatment-gas is ejected from the vicinity of the transfer belt toward the transfer belt below the hollow nozzle, so that the heat-treatment-gas collides with the food. The heat-treatment-gas flow that collides with the food forms a film flow along the surface of the food in closer touch with the surface, by Coanda effect. Thus, the food sufficiently keeps in contact with the heat-treatment-gas, and the efficiency of the heat exchange between the food and the heart-treatment-gas is enhanced.

The upper face of the hollow nozzle also serves as a support plane for supporting rails of the transfer belt that slides on and along the rails. Thus, the configuration of the spiral transfer route can be simplified, and the weight of the transfer belt can be reduced. Further, a plurality of hollow nozzles are provided so that each hollow nozzle protrudes toward the space between vertically successive loops of the endless transfer belt, and ejects the heat-treatment-gas toward the food transferred on the belt below the hollow nozzle. A gas stream that streams along the transfer belt plane can be formed by the heat-treatment-gas blowing against the surface of the food. The heat-treatment-gas that has collided with the food can be effectively discharged along the gas flow. Therefore, the heat-treatment-gas that has collided with the food does not disturb the gas jet (stream) that is ejected later from the hollow nozzle. Accordingly, the efficiency of the heat exchange between the heat-treatment-gas and the food can be further enhanced.

Thus, according to the above-described first invention, the efficiency of the heat exchange between the heat-treatment-gas and the food can be enhanced, and the heat-treatment speed of the food can be increased. Therefore, the food transfer route length in the storeroom can be reduced, so that the spiral transfer route can be installed within a limited floor-space.

As the spiral transfer route is formed to surround the heat-treatment-gas generating device and the gas distribution duct is arranged between the heat-treatment-gas generating device and the spiral transfer route, the supply path of the heat-treatment-gas from the heat-treatment-gas generating device to the hollow nozzle can be shorter in comparison with conventional configurations. Thus, the heat-treatment-gas distribution toward the hollow nozzle can be easily achieved.

Moreover, since nothing needs to be placed outside the spiral transfer route in the present embodiment, the outer walls of the storeroom can be placed just near the spiral transfer route. Hence, the footprint of the storeroom can be reduced, and the storeroom itself can be downsized. In addition, the generating amount of the heat-treatment-gas can be reduced.

A preferable example according to this first invention is the spiral transfer heat-treatment apparatus, the distribution duct includes;

a gas receiving space that receives the heat-treatment-gas ejected from the hollow nozzle; and a plurality of perforations through which the heat-treatment-gas flows into the gas receiving space, on an outer surface of the distribution duct at a side facing the endless transfer belt;

whereby the heat-treatment-gas flowing into the gas receiving space returns back to the heat-treatment-gas generating device.

In this way, the heat-treatment-gas after having collided with the food can be smoothly removed from the region around the food. Hence, the flow of the heat-treatment-gas ejected from the hollow nozzles is not disturbed, to maintain the high efficiency of heat exchange between the food and the heat heat-treatment-gas. In the invention, such stable circulation flow is formed that the heat heat-treatment-gas ejected from the hollow nozzles can return back to the heat-treatment-gas generating device.

Another preferable example according to this first invention is the spiral transfer heat-treatment apparatus, the apparatus further comprising:

a gas receiving duct that receives the heat-treatment-gas ejected from the hollow nozzle, provided outside the spiral transfer route, the gas receiving duct including a plurality of perforations through which the heat-treatment-gas flows into the gas receiving duct, on an outer surface the gas receiving duct;

whereby the heat heat-treatment-gas flowing into the gas receiving duct returns back to the heat-treatment-gas generating device.

In this way, as is the case with the former example, such stable (not disturbed) circulation flow of the heat-treatment-gas is formed that the efficiency of heat exchange between the food and the heat-treatment-gas can be enhanced.

As a matter of course, both of the gas receiving space inside of the distribution duct and the gas-receiving duct outside the spiral transfer route may be provided at the same time. In this case, the circulation flow of the heat-treatment-gas can be further smoothly formed so that the heat heat-treatment-gas ejected from the hollow nozzles returns back to the heat-treatment-gas generating device.

In another preferable example of the first invention, the spiral transfer route includes a straight part and an arc-shaped part; and the arc-shaped part of the spiral transfer route is provided with a plurality of hollow nozzles of a fan-shaped type, that are configured such that the ejection area of the heat-treatment-gas from the fan-shaped hollow nozzle is broadened in the width direction of the transfer belt from inside to outside, the time span in which the food receives the blow of the heat-treatment-gas being kept constant regardless of the width direction position of the transfer belt.

With the configuration of the fan shaped hollow nozzle, the time span in which the food receives the blow of the heat-treatment-gas can be kept constant, even if food position on the transfer belt varies in the width direction. Thus, the uniform heat-treatment effect on the food along the width direction of the transfer belt can be achieved.

In another preferable example of the first invention, the apparatus is provided with a drive mechanism of the transfer belt that includes:

a drive motor provided outside of the spiral transfer route;
a plurality of drive shaft installed upright, adjacent to the spiral transfer route, and driven by the drive motor; and a belt drive mechanism that transmits a drive torque of the drive shaft to the transfer belt to make the transfer belt slide on the rails toward the transfer direction.

With the configuration of the above example, it is not necessary to provide the drive device for the transfer belt inside the spiral transfer route, resulting in that a sufficient space can be obtained so that the heat-treatment-gas generating device is arranged there. Thus, the degree of freedom regarding the layout of the heat-treatment-gas generating device and the distribution duct can be increased.

Further, in comparison with the conventional case where a rotating drum is used as in the patent reference 1 or 2, the present invention does not need the power for rotating the drum, thus the drive torque and the drive power can be remarkably reduced.

The present invention discloses, as a second invention, a spiral transfer heat-treatment apparatus, comprising:

a spiral transfer route formed in a storeroom so that the food is heat-treated by heat-treatment-gas while transferring the food;

a heat-treatment-gas generating device that is placed in a space inside the spiral transfer route;

at least one distribution duct that is placed between the heat-treatment-gas generating device and the spiral transfer route, the duct inhaling the heat-treatment gas generated by the heat-treatment-gas generating device:

wherein the spiral transfer route includes;

an endless transfer belt on which food is transferred, and a plurality of hollow nozzles that protrudes from the distribution duct toward the space between vertically successive loops of the endless transfer belt without contact with the transfer belt, the nozzles ejecting the heat-treatment-gas toward the transfer belt below or above the hollow nozzle.

It is noted that the heat-treatment-gas in the above-described first and second invention means a gas (including air) that is blown against food to perform a heat-treatment for the food in a state of cooled gas, warm gas or heated gas.

The configuration of the heat-treatment-gas generating device and the distribution duct in the second invention is the same as those in the first invention. However, the hollow nozzles protrudes from the distribution duct toward the space between vertically successive loops of the endless transfer belt without contact with the transfer belt, and ejects the heat-treatment-gas toward the transfer belt below or above the hollow nozzle.

As the transfer belt and the hollow nozzles are arranged without contact with each other, the layout of the transfer belt and the layout of the hollow nozzles can be independent of each other. It is possible to assemble the transfer belt and the hollow nozzles after designing and manufacturing them independently. Thus, easy assembly of the heat-treatment-gas generation device can be realized, the degree of freedom of the layouts can be increased, and the degree of precision as to the assembling processes can be relieved. Thus, the assembly or installation as to the whole device can be made easier.

In a preferable example of the second invention, the apparatus further comprising:

a plurality of support struts installed upright outside of the transfer belt; and at least one rail provided between the support struts to support the transfer belt so as to be slidable along the transfer route.

In this way, with a simple configuration of the support mechanism provided outside the hollow nozzles, the transfer belt can be surely placed and supported.

In another preferable example of the second invention, the transfer belt includes:
- a lower inlet transfer route that is arranged around a neighborhood of a space below the heat-treatment-gas generating device and the distribution duct;
- a spiral upward route that is connected to the lower inlet transfer route, forming a spiral upward route along traveling direction of the food to surround the heat-treatment-gas generating device and the distribution duct;
- an S-shaped turnaround route that is connected to the spiral upward route and placed above the heat-treatment-gas generating device and the distribution duct, the S-shaped turnaround route forming a S-shaped curve route to reverse traveling direction of the food;
- a spiral downward route that is connected to the S-shaped turnaround route, forming a spiral downward route along the traveling direction of the food; and
- a lower outlet transfer route that is extended from the spiral downward route and arranged in a neighborhood of the lower inlet transfer route.

According to the above-described configuration, as the spiral upward route and the spiral downward route can be arranged to surround the heat-treatment-gas generating device and the distribution duct, a long food transfer route can be realized within a narrow (limited) space.

Further, the transfer direction along the spiral upward route is opposite to that along the spiral downward route. Therefore, even if the blowing condition of the heat-treatment-gas from the hollow nozzle toward the food is uneven along the width direction of the transfer belt, the heat treatment effect on the food can become even along the width direction of the transfer belt, while the food travels on the whole spiral routes of the upward and downward routes.

In this way, without providing a hollow nozzle of special configuration such as fan-shaped hollow nozzles at the arc-shaped parts of the transfer belt as described in the first invention, uneven heat treatment on the food can be prevented. For instance, with a simple configuration of a radial arrangement of tubular hollow nozzles, an even heat treatment by the heat-treatment-gas along the width direction of the transfer belt can be obtained.

Further preferably, the apparatus of the second invention is provided with a drive mechanism of the transfer belt including:
- a drive motor that is provided outside of the spiral transfer belt;
- a drive shaft that is installed upright outside of the spiral transfer route adjacently, the drive shaft being driven by the drive motor;
- a driven shaft that is installed upright adjacent to the drive shafts, the driven shaft being driven and rotated in a reverse rotation direction of the drive shaft by the drive shaft via a gear mechanism;
- a first power transmission mechanism that transmits the drive torque of the drive shaft to one of the transfer belt of the spiral upward route and the transfer belt of the spiral downward route; and
- a second power transmission mechanism that transmits the drive torque of the driven shaft to the other one of the transfer belt of the spiral upward route and the transfer belt of the spiral downward route:
wherein the spiral transfer rotation direction of the spiral upward route is opposite to that of the spiral downward route.

In the above example, with a simple configuration of the power transmission mechanisms, a rotation direction of the spiral upward route can be turned into the reverse rotation direction in the spiral downward route. Further, it becomes unnecessary to provide a drive device for the transfer belt inside the spiral transfer route. Thus, a sufficient space is ensured to arrange the heat-treatment-gas generating device inside of the spiral transfer route, without being hindered by the drive mechanisms. Hence, the degree of freedom of the layout of the heat-treatment-gas generating device as well as the distribution duct can be increased.

Moreover, as the power for rotating the drum is not necessary, the drive torque and the drive power can be remarkably reduced.

Preferably, in another example of the second invention, the hollow nozzles are configured to have a tubular shape, and
- the nozzles are arranged in multiple stages in vertical direction and arranged at equal intervals in each stages.

As described above, with the simple shape and the regular arrangement of the tubular hollow nozzles, an even heat treatment on the traveling food by the heat-treatment-gas along the width direction of the transfer belt can be obtained, since the food travels round the spiral upward and downward routes. Moreover, in a case where the tubular hollow nozzles are installed on the distribution duct, for example, by a screw-in method or a fit-in method so that the hollow nozzles can be detachably connected to the duct, an easy installation of the hollow nozzles onto the distribution duct can be ensured.

In another preferable example according to the first or second invention, the apparatus further comprises a plurality of guide plates installed upright along each longitudinal side edge of an oval track of the spiral transfer route, the guide plates guiding the heat-treatment-gas ejected from the hollow nozzles toward the neighborhood of the gas inlet of the heat-treatment-gas generating device.

In this way, the heat-treatment-gas after having ejected from the hollow nozzle can effectively perform heat treatment of the food traveling over the area other than the space right below or right above the hollow nozzle. Further, the guide plates can guide the heat-treatment-gas to the neighborhood of the gas inlet opening of the heat-treatment-gas generating device. Accordingly, a circulatory flow of the ejected heat-treatment gas returning to the heat-treatment-gas generating device can be formed easily. Thus, the pressure loss in the circulatory flow can be reduced, and the power necessary to form a circulation flow in the apparatus can be reduced.

EFFECT OF INVENTION

According to the first invention, a spiral transfer heat-treatment apparatus comprises:
- a spiral transfer route formed in a storeroom so that food is heat-treated by heat-treatment-gas while transferring the food;
- a heat-treatment-gas generating device that is placed in a space inside the spiral transfer route;
- at least one distribution duct that is placed between the heat-treatment-gas generating device and the spiral transfer route, the duct inhaling the heat-treatment gas generated by the heat-treatment-gas generating device:
wherein the spiral transfer route includes;
- an endless transfer belt on which food is transferred, and
- a plurality of hollow nozzles that protrude from the distribution duct toward spaces between vertically successive loops of the endless transfer belt and support at least two rails, on which the transfer belt slides to move, with the upper surface of the hollow nozzles, the hollow nozzles ejecting the heat-treatment-gas toward the food transferred on the belt below the hollow nozzle.

By constructing as above, a film flow of the heat-treatment-gas along the surface of the food can be formed in closer touch with the surface by Coanda effect. As a result, the footprint of the spiral transfer route can be reduced. Further, since the heat-treatment-gas generating device and the distribution duct can be arranged inside the spiral transfer route, the storeroom floor area of the apparatus can be reduced.

Moreover, the support mechanism for supporting the spiral transfer route can be simplified as well as the weight thereof can be reduced, for the transfer belt is supported on the upper face of the hollow nozzles.

According to the second invention, a spiral transfer heat-treatment apparatus, comprising:

a spiral transfer route formed in a storeroom so that the food is heat-treated by heat-treatment-gas while transferring the food;

a heat-treatment-gas generating device that is placed in a space inside the spiral transfer route;

at least one distribution duct that is placed between the heat-treatment-gas generating device and the spiral transfer route, the duct inhaling the heat-treatment gas generated by the heat-treatment-gas generating device:

wherein the spiral transfer route includes;

an endless transfer belt on which food is transferred, and a plurality of hollow nozzles that protrudes from the distribution duct toward the space between vertically successive loops of the endless transfer belt without contact with the transfer belt, the nozzles ejecting the heat-treatment-gas toward the transfer belt below or above the hollow nozzle.

As is the case with the apparatus in the first invention, according to the second invention, the heat treatment effect on the food can be also enhanced. Further, as the layout of the hollow nozzles and the layout of the transfer belt do not hinder each other, both layouts can be designed independently. Hence, the transfer belt and the hollow nozzles can be assembled after designing and manufacturing them independently. Thus, the easy assembly of the heat-treatment-gas generation device can be realized. Further, the degree of freedom as to the layouts can be increased, and the degree of precision as to the assembling processes can be relieved. Thus, assembly or installation of the whole device can be made easier.

BRIEF DESCRIPTION OF THE DRAWINGS

The present invention will now be described in greater detail with reference to the preferred embodiments of the invention and the accompanying drawings, wherein.

DETAILED DESCRIPTION OF THE PREFERRED EMBODIMENTS

Hereafter, the present invention will be described in detail with reference to the embodiments shown in the figures. However, the dimensions, materials, shape, the relative placement and so on of a component described in these embodiments shall not be construed as limiting the scope of the invention thereto, unless especially specific mention is made.

(First Aspect)

Figure 1:
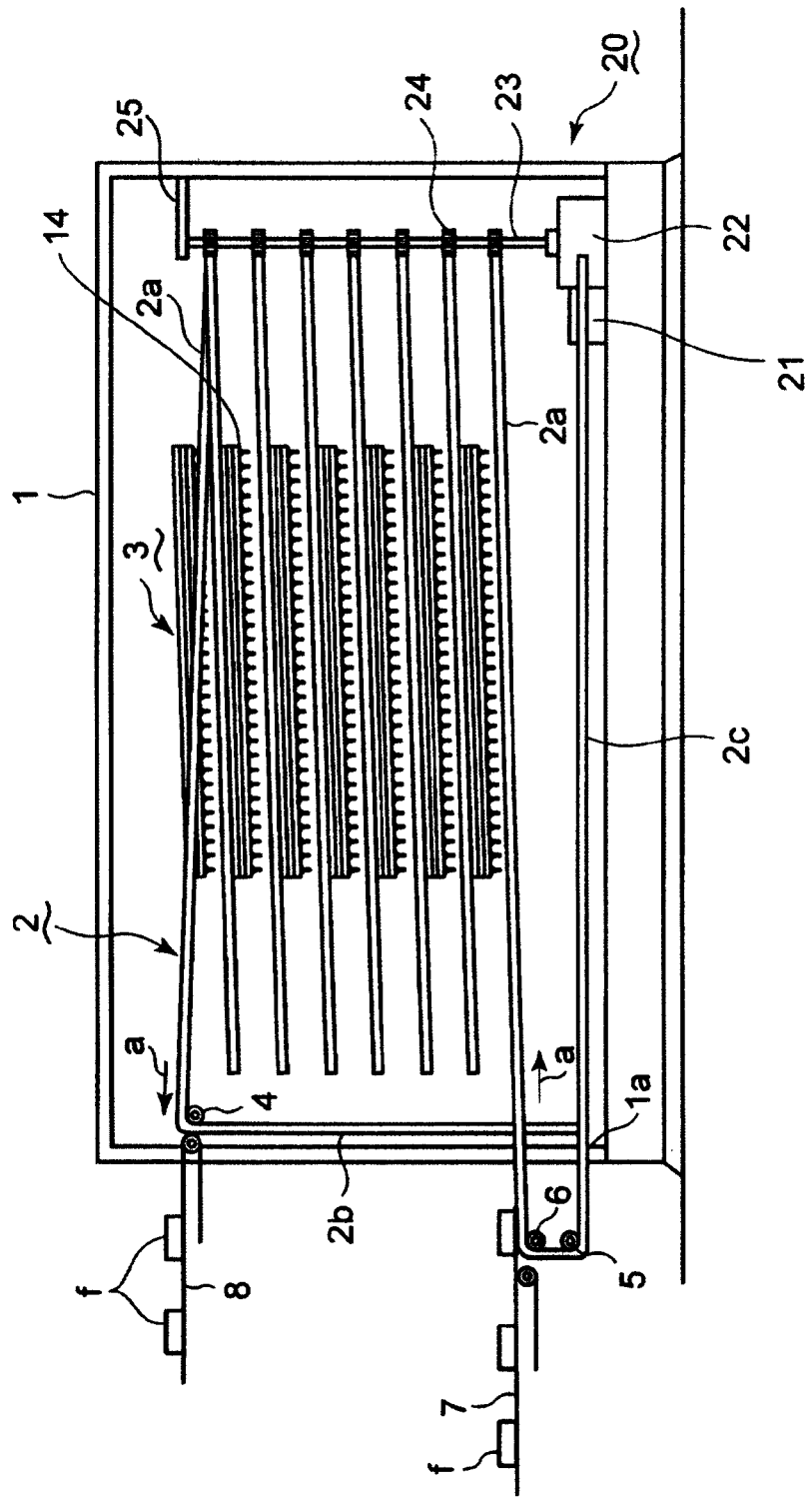
FIG. 1 shows an elevation view of a spiral freezer, according to first embodiment of first invention.
Figure 2:
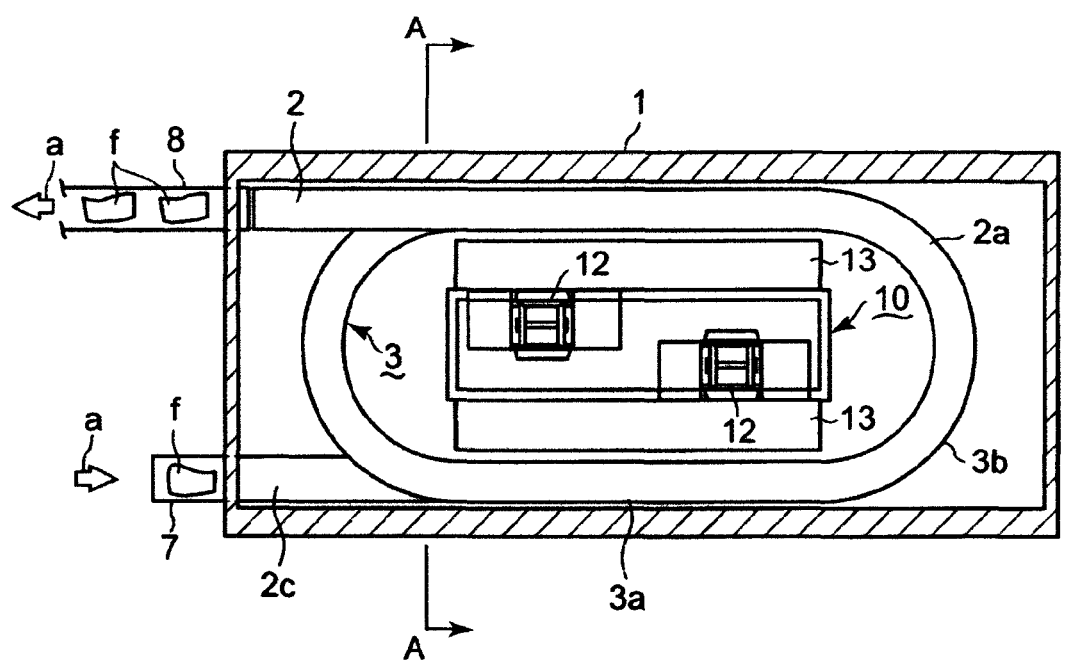
FIG. 2 shows a plan view of the spiral freezer, according to the first embodiment.
Figure 3:
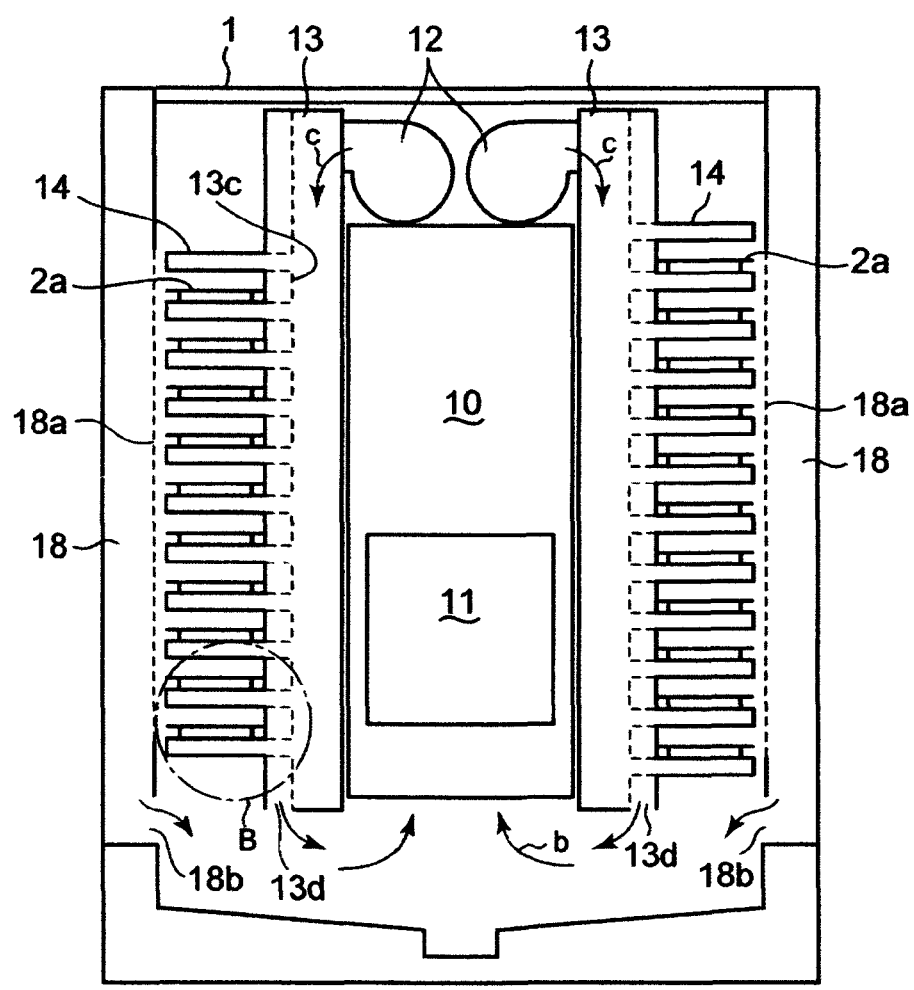
FIG. 3 shows an A-A cross-section in FIG. 2.

Based on FIGS. 1 to 6, the first embodiment regarding a spiral freezer according to the first invention is now explained. FIG. 1 shows an elevation view of a spiral freezer of the first embodiment, FIG. 2 shows a plan view of the spiral freezer, and FIG. 3 shows an A-A cross section in FIG. 2. As shown in FIG. 1, inside a freezing storeroom 1 that is capable of forming an enclosed space is spirally arranged an endless transfer belt 2 configured in a network having a number of fine slots. A spiral transfer route 3 is formed so that the endless transfer belt 2 and food f placed thereon slide along the spiral transfer route 3, where cryogenic air of temperature of 0° C. or lower is ejected toward the food f so as to quick-freeze the food f.

As shown in FIG. 2, when seen from the top, the spiral transfer route 3 forms an oval track shape that consists of a pair of straight parts 3a in the middle section of the oval track and a pair of arc-shaped parts 3b on both sides.

The endless transfer belt 2 comprises a spiral route 2a along which the transfer belt moves upward, a vertical route 2b along which the transfer belt vertically descends from the end of the spiral route 2a, and a level route 2c along which the transfer belt moves horizontally after passing through the lower end of the vertical route 2b. A part of the level part 2c is located outside of the freezing storeroom 1, going out of the storeroom at an outlet 1a thereof. The transfer belt is guided by a guide roller 5 and a guide roller 6. The transfer belt receives food f from a food-entering conveyor 7, then moving along the spiral route 2a, and passes the frozen food f to a food-discharging conveyor 8 at the upper end of the spiral route 2a to be discharged outside.

As shown in FIGS. 2 and 3, a freezing unit 10 is placed inside of a pair of straight parts 3a that are located in the middle section of the oval-track-shaped spiral transfer route 3. The freezing unit 10 comprises already known components of a refrigerator machine constructing a refrigeration cycle. The freezing unit 10 inhales the air in the storeroom 1 as indicated by an arrow b in FIG. 3. The inhaled air is cooled by a heat exchanger in the freezing unit so that the temperature of the inhaled air reaches 0° C. or lower. In the freezing unit 10 is further provided with a pair of blowers 12 that deliver the cooled air toward a plurality of distribution ducts 13. The distribution duct 13 is arranged between the freezing unit 10 and the straight part 3a located in the middle section of the oval-track-shaped spiral transfer route 3, forming flow passage of the cooled air c.

Figure 4:
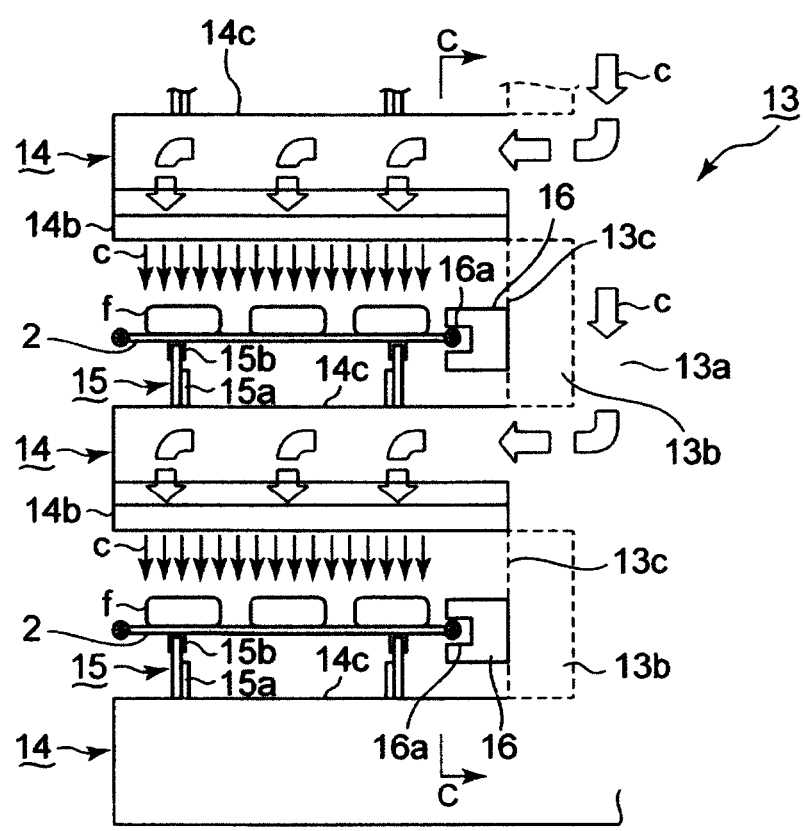
FIG. 4 shows an enlargement of a part B shown in FIG. 3.
Figure 5A:
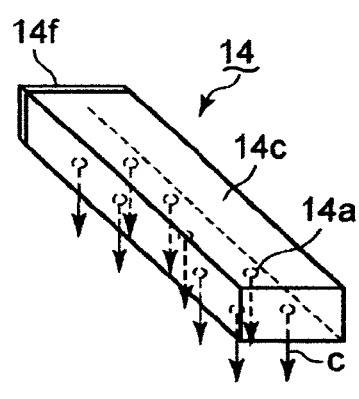
FIG. 5(A) shows a perspective view of a configuration example of a hollow nozzle 14.
Figure 5B:
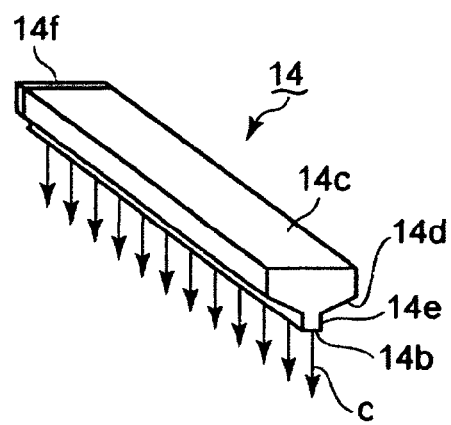
FIG. 5(B) shows a perspective view of another configuration example as of a hollow nozzle 14.

The distribution duct 13 is provided with a number of hollow nozzles 14 that protrudes toward the outside of the distribution duct 13, as a number of sticks protrude from a handle of a hairbrush. FIGS. 4, 5(A) and 5(B) are now referred to for explaining the structure of the hollow nozzles 14. FIG. 4 shows an enlargement of the part B in FIG. 3, and each of FIGS. 5(A) and 5(B) shows a perspective view of configuration example of the hollow nozzle. As shown in FIGS. 4, 5(A) and 5(B), the hollow nozzle 14 has a hollow space that communicates with the inside of the distribution duct 13, and at least one vent through which cooled air gushes vertically downward, at the lower part of the nozzle. Further, the upper outside surface 14c of the hollow nozzle 14 forms a support plane (face) for supporting at least two rails 15 which supports slidably the transfer belt 2.

Each of FIGS. 5(A) and 5(B) shows a configuration example of the cooled air vent of the hollow nozzle 14. In the example of FIG. 5(A), an undersurface of the hollow nozzle 14 forms a level plane, being provided with a plurality of nozzle holes 14a that are dispersed over the undersurface. The cooled air c gushes vertically downward through the nozzle holes 14a toward the transfer belt 2 below the nozzle holes 14a, thus forming a collision jet that collides with the food f. Further, the hollow nozzle has a fitting part 14f at the base of the hollow nozzle 14, being connected to the distribution duct 13 such a manner that the fitting part 14f is fitted in a perforated hole provided on the surface of the distribution duct. Thus, the hollow nozzle 14 can be connected to the distribution duct 13 with one-touch operation. Hence, the hollow nozzle can be easily attached to the duct. A hollow nozzle 14 depicted in FIG. 5(B) is also provided with a fitting part 14f.

In FIG. 5(B), the lower part of the hollow nozzle 14 is funnel-shaped in a cross section. At the bottom end of the hollow nozzle 14 is provided at least one slit-shaped vent 14b, through which the cooled air c gushes vertically downward. Further, a running approach 14e is arranged between the lower end of the tilting slope of the funnel and the bottom end provided with the vent 14b, in such a manner that uniform cross-section same as the bottom end continues along the running approach 14e. Since the cooled air c is ejected through the running approach 14e, an ejected jet-stream can go far away. Hence, when the hollow nozzle 14 having such a running approach is adopted, the food is sufficiently kept in contact with the heat-treatment-air. In other words, the adhesion between the food and a cooled air film of the jet stream air around the food is enhanced. Thus, the efficiency of the heat exchange is enhanced. Note that the hollow nozzle in FIG. 5(B) is applied in the embodiment of the FIG. 4.

As shown in FIG. 4, the upper face 14c of the hollow nozzle 14 forms a level plane, on which two rails 15 are fixed in parallel each other. Each of the rails comprises a metal rail 15a that is attached to the upper face 14c, and a plastic rail 15b that is configured to cover the upper ridge line of the metal rail 15a. Thus, the plastic rail of a small friction property is applied to the mountain ridge part of each rail so that a friction force generated between the rail 15 and the transfer belt 2 is restrained.

While each of the hollow nozzles is horizontally-disposed, as a whole the hollow nozzles are arranged such that spiral route can be formed, parallel to the spiral transfer route, by lines connecting center points of two adjacent hollow nozzles. The transfer belt 2 is arranged on the rails so as to be slidable thereon and forms the spiral route 3. On the other hand, at the outer surface of the distribution duct 13 between two vertically-adjacent hollow nozzles, a bracket 16 with a concave 16a is fixed to the distribution duct so as to support the inner side of the endless transfer belt 2, thereby the continuing consecutive brackets 16 forming the spiral route.

The distribution duct 13 further comprises a cooled air return passage 13b that receives the cooled air c having finished the cooling of the food F. The air return passage 13b configures a divided passage different from an air supply passage 13a, the passages 13a and 13b being divided as depicted with a broken line in FIG. 4. The air return passage 13b is provided with a plurality of openings 13c through which the cooled air flows into the return passage 13b. Further, an air outlet 13d which discharges the cooled air c is formed at the lower end of the spiral route, as shown in FIG. 3.

As shown in FIG. 3, a circulation duct 18 is arranged adjacent to the outer side of the spiral transfer route 3 of the transfer belt, the circulation duct 18 is provided with a plurality of openings 18a through which the cooled air c having finished the cooling of food F flows into the circulation duct 18. Further, an air outlet 18b is formed at the lower end of the circulation duct 18, as shown in FIG. 3.

Thanks to the configuration as described above, the cooled air c having been ejected from the hollow nozzle 14 and collided with the food f forms a film flow along the surface of the food by Coanda effect. Thus the food f sufficiently keeps in contact with the cooled air so that the food f is cooled with high efficiency of the heat exchange. The cooled air c flows into the air return passage 13b or the circulation duct 18, and then the cooled air c is discharged into a lower space of the storeroom through the air outlet 13d of the air return passage 13b or the air outlet 18b of the circulation duct 18, respectively. Further, the discharged cooled air returns back into the freezing unit 10 so that a circulation flow of the cooled air is formed.

Following the above, according to FIG. 1, a drive mechanism 20 that drives the transfer belt 2 is now explained. As shown in FIG. 1, a drive motor 21 and a reduction gear 22 are provided on the floor inside the freezing storeroom 1. Through and over the reduction gear, a drive shaft 23 is installed upright, and the driving torque from the drive motor 21 to the drive shaft 23 via the reduction gear 22. A plurality of torque transmission gears 24 are securely installed on the drive shaft 23 at each spiral pitch height of the transfer belt. Each of the torque transfer gears meshes with a rack (not shown) provided on outer periphery of the spiral endless transfer belt 2 so that the transfer belt is moved by the revolution of the drive shaft 23. Further, a bracket 25 is attached to the inner wall of the storeroom 1 to support the top end of the drive shaft 23.

Figure 6:
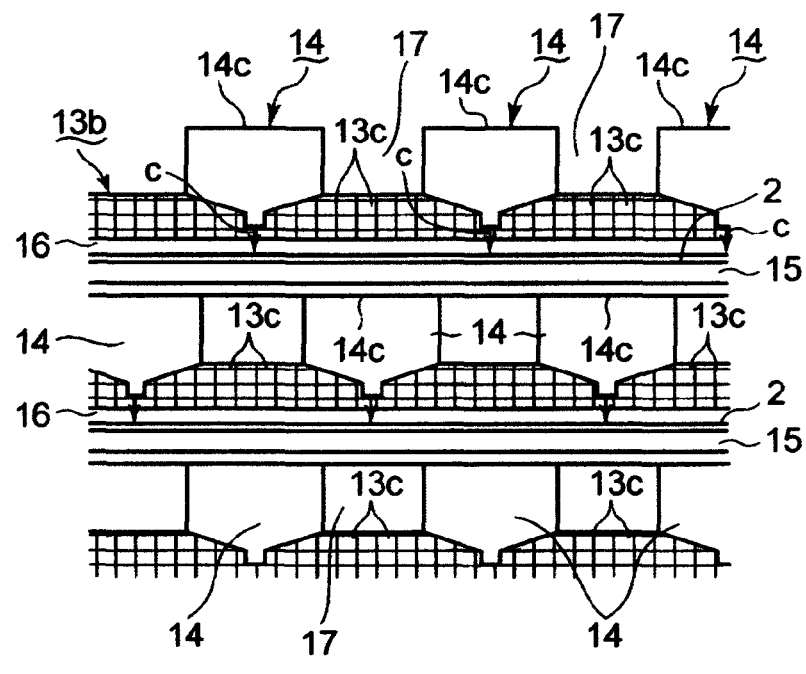
FIG. 6 shows a C-C cross-section in FIG. 4.

Furthermore, as shown in FIG. 6, the hollow nozzles 14 are arranged in a hound's-tooth check pattern. The arrangement can avoid the interference between streams of cooled air c ejected from the nozzle and colliding with food F. Therefore, the occurrence of a turbulent flow can be restrained. Accordingly, the film flow formed along the surface of the food f is not disturbed to maintain the cooling effect of the food f.

Moreover, the cooled air after cooling the food f leaves the surface of the food f to be quickly discharged through the opening 13c or 18a. As a result, the film flow staying in closer touch with the surface of the food f is not disturbed.

In this embodiment of the above-described configuration, the food f that is conveyed by a food-entering conveyor (an inlet belt conveyer) 7 is passed to the food receiving point of the spiral route 2a of the endless transfer belt 2. The food received at the receiving point moves along the direction indicated by an arrow a and reaches an advanced point on the spiral route 2a. The food f is cooled by the collision jet of a high-pressure cooled air ejected vertically downward from the vent 14b of slit shape of the hollow nozzle 14. When the high pressure collision jet collides with the food f, a film flow is formed due to Coanda effect along the surface of the food, thereby the food f is cooled by the cooled air with a high heat-exchange-efficiency.

Further, the food f is quickly frozen while being conveyed through the spiral transfer route 3. When a top point of the spiral route 2a is reached, the food f is shifted to a food-discharging conveyer (an outlet belt conveyer) 8 to be delivered outside of the freezing storeroom 1.

According to this embodiment, the collision jet of the cooled air c gushes toward the food f on the transfer belt 2 from the hollow nozzle 14 that is placed just over the food on the transfer belt 2. Therefore, the close contact between the cooled air c and the food f can be kept due to Coanda effect, and the cooling effect of the food f can be enhanced. Moreover, the upper face 14c of the hollow nozzle also serves as the support plane for supporting the rails 15 of the transfer belt. Accordingly, the configuration of the spiral transfer route 3 can be simplified, and the weight thereof can be reduced.

Since a plurality of hollow nozzles 14 protrudes toward the outside of the distribution duct 13 with a certain distance between adjacent hollow nozzles, like a number of sticks protruding from a handle of a hairbrush, a discharge passage 17 for the cooled air can be formed between adjacent hollow nozzles 14. As the cooled air having finished cooling can be discharged through not only the openings 13b and 18a but also the discharge passage 17, the cooled air c can be effectively prevented from stagnating around the food. Hence, it can be prevented that the cooled air having left the food surface hinders the film flow which is formed by the subsequently ejected cooled-air.

In this way, the food can be frozen quickly, as well as the length of the endless transfer belt 2 can be reduced. As a result, the design freedom as to the component arrangements can be enhanced. For example, the pitch of the endless spiral transfer belt 2 can be increased in the vertical direction.

Further, as the freezing unit 10 and the distribution duct 13 are placed inside of the spiral transfer route 3, an empty space can be provided outside of the spiral transfer route 3 in the storeroom 1. Thus, the interior walls of the storeroom that surround the spiral transfer route can be placed just near the spiral transfer route 3. Accordingly, the footprint of the storeroom 1 can be reduced. Further, with the reduced footprint, the cooling efficiency of the food f can be enhanced.

Moreover, on the both sides of the endless transfer belt 2 are provided with the flow return passage 13b having the openings 13c for the cooled air c, and the circulation duct 18 having the openings 18a for the cooled air c. Thereby, the cooled air c having collided with the food f can be removed from the neighborhood of the food f. Thus, the cooled air c that has left the surface of the food f does not disturb a new ejection of flow formed by the subsequently ejected cooled-air. As a result, the cooling efficiency of the food f can be enhanced.

In the storeroom 1, the following stable airflows as to the cooled air are formed:
- a cooled air flow that streams from the blower 12 of the freezing unit 10 through the distribution ducts 13 into the hollow nozzles 14;
- a cooled air flow that returns back to the freezing unit 10 via the flow return passages 13b in the distribution duct 13 and the air outlet 13d of the flow return passage 13b, or via the circulation duct 18 and the lower duct outlet 18b of the circulation duct 18.

Thanks to the above-described stable airflows, the pressure loss of the cooled air or the circulation flows thereof can be reduced, so that the power needed to drive the blowers 12 can be reduced.

Further, the hollow nozzle 14 can be fitted to the distribution duct 13 with one-touch operation, through the fitting part 14f. Therefore, a number of the hollow nozzles can be easily fitted to the distribution duct, resulting in that the installation of the spiral freezer can be simplified. Further, when the distribution duct 13 is provided with spare perforated holes, the hollow nozzles 14 can be selectively installed so that the degree of freedom of the hollow nozzle installation is increased.

Moreover, as the endless transfer belt 2 and the drive mechanism 20 are provided outside of the spiral transfer route 3, the space inside the spiral transfer route 3 can be used for the installation space of the freezing unit 10, the distribution duct 13 and the related components. Accordingly, the installation space can be saved. Further, only the transfer belt 2 is driven, what is more, the transfer belt 2 slides over the upper faces 14c of the hollow nozzles 14. As a result, the drive torque of the drive motor 21 can be reduced.

(Second Aspect)

Figure 7:
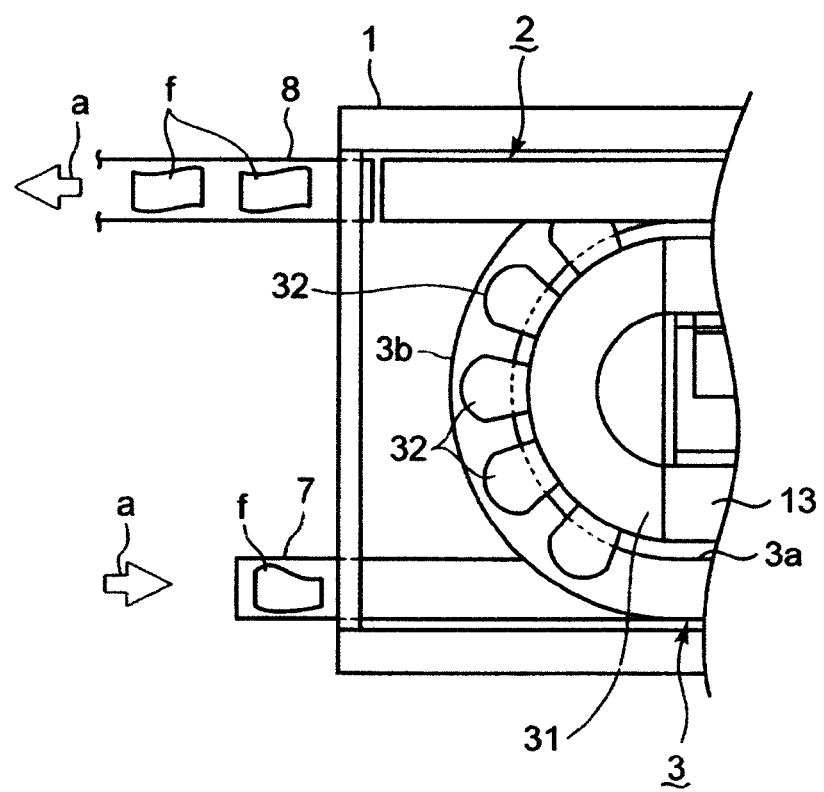
FIG. 7 shows a part of a plan view of a spiral freezer, according to second embodiment of the first invention.

Hereinafter, the second embodiment of the first invention is explained based on FIG. 7 that shows a part of a plan view of this second embodiment. In this second embodiment as shown in FIG. 7, on both sides of the distribution ducts 13 that are arranged inside of the straight parts 3a of the spiral transfer route 3, a pair of distribution ducts 31 of a half-round arc shape is provided so as to communicate with the distribution ducts 13. Thus, in this second embodiment, the distribution ducts 13 and 31 form one continuous closed-loop of distribution duct (a 360 degrees arc shape geometry), inside of the spiral transfer route 3. A difference between the first and second embodiments is that a plurality of fan-shaped hollow nozzles 32 are provided outside of the half-round arc shaped distribution-ducts 31, the nozzles 32 protruding outside along the width direction of the transfer belt 2.

The fan-shaped hollow nozzle 32 is formed such that the width thereof is wider than the hollow nozzle 14 in the first embodiment. Further, the fan-shaped hollow nozzle 32 broadens toward its tip part such that the width in the hoop direction of the fan increases as the hoop radius increases toward outside. The wider the above-described width, the longer the path length in which the food (at the hoop radius location) receives the cooled air jet. On the other hand, the hoop direction speed of the food (at the hoop radius location) is proportional to the hoop radius. Therefore, regardless of the hoop radius, the time span in which the food f (at the hoop radius location) receives the cooled air jet can be kept constant.

Except for the above components, the configuration of the second embodiment is the same as that of the first embodiment. Same numerals or symbols are used for explaining the second embodiment, and the explanation for the same will be omitted.

In this second embodiment, the hollow nozzles 14 that protrude toward the straight part 3a of the spiral transfer route 3 are provided, while the fan-shaped hollow nozzles 32 that protrude toward the half-round arc part 3b of the spiral transfer route 3 are provided. Accordingly, the cooling effect is enhanced in the second embodiment in comparison with the first embodiment. In other words, the further improved quick-freezing can be realized. Further, with the fan-shaped hollow nozzle 32 that is provided to protrudes toward the half-round arc part 3b of the spiral transfer route 3, the time span in which the food f receives the cooled air jet can be kept constant regardless of the position in width direction. Thus the uneven cooling effect on the food f along the width direction of the transfer belt 2 can be evaded. Hence, even food cooling can be realized.

As the half-round arc shaped distribution-ducts 31 and the fan shaped hollow nozzle 32 are additionally provided, the installation cost might increase accordingly. However, the length of the endless spiral transfer belt can be reduced with an enhanced cooling effect. Accordingly, the footprint of the storeroom can be reduced, and the installation cost of the whole spiral freezer can be reduced.

In the above explanation for the first embodiment, FIG. 1 is used for explaining the drive mechanism for driving the transfer belt 2. However, instead of the drive mechanism in FIG. 1, a drive mechanism disclosed in the patent reference 3 may be adopted. Namely, it may be configured that the drive force of the drive shaft 23 is transmitted to the transfer belt 2 via pairs of bevel gears and sprocket wheels, by driving a chain link that is provided at the outer side of the transfer belt.

(Third Aspect)

Figure 8:
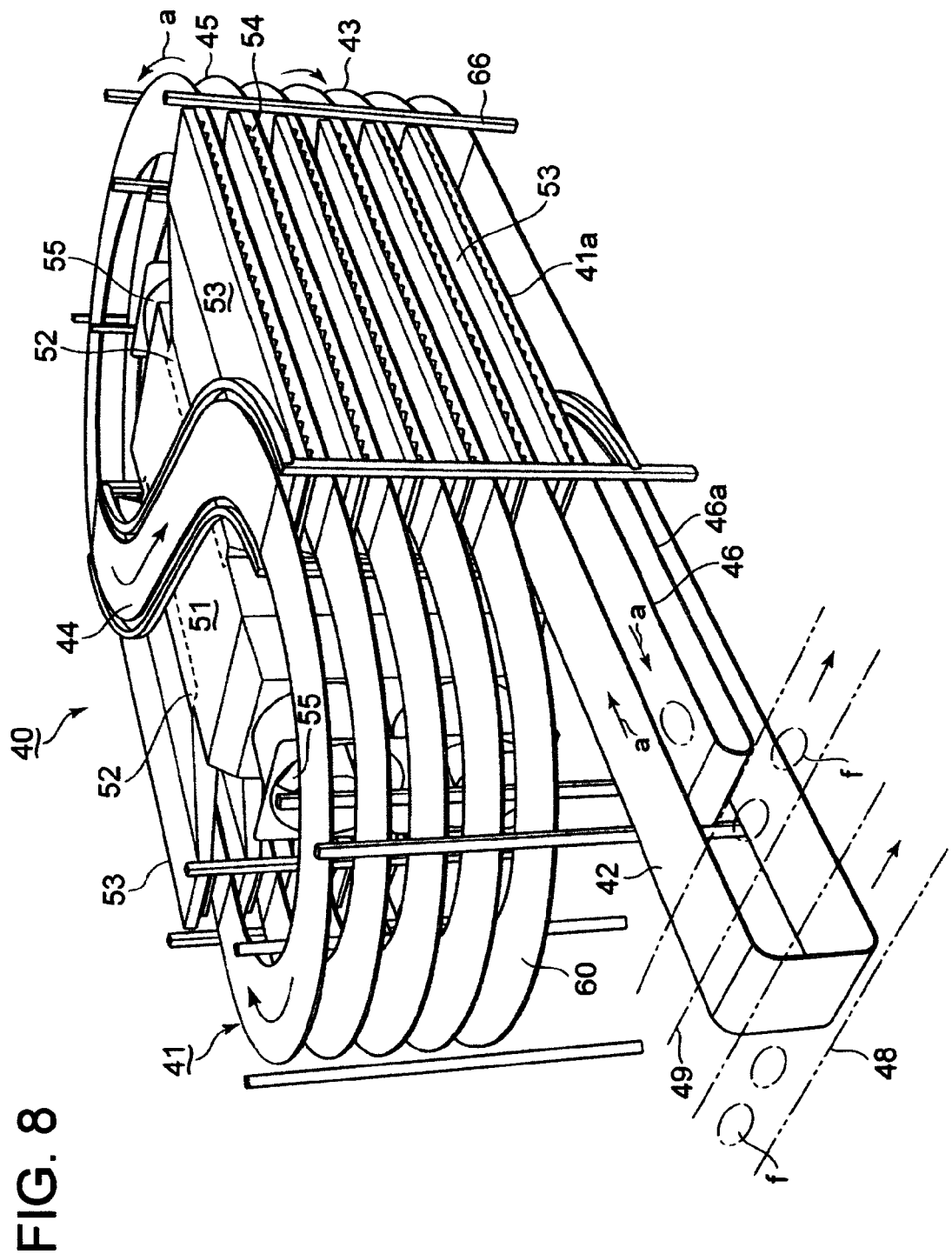
FIG. 8 shows a perspective view from a front side of a spiral freezer, according to first embodiment of second invention.
Figure 9:
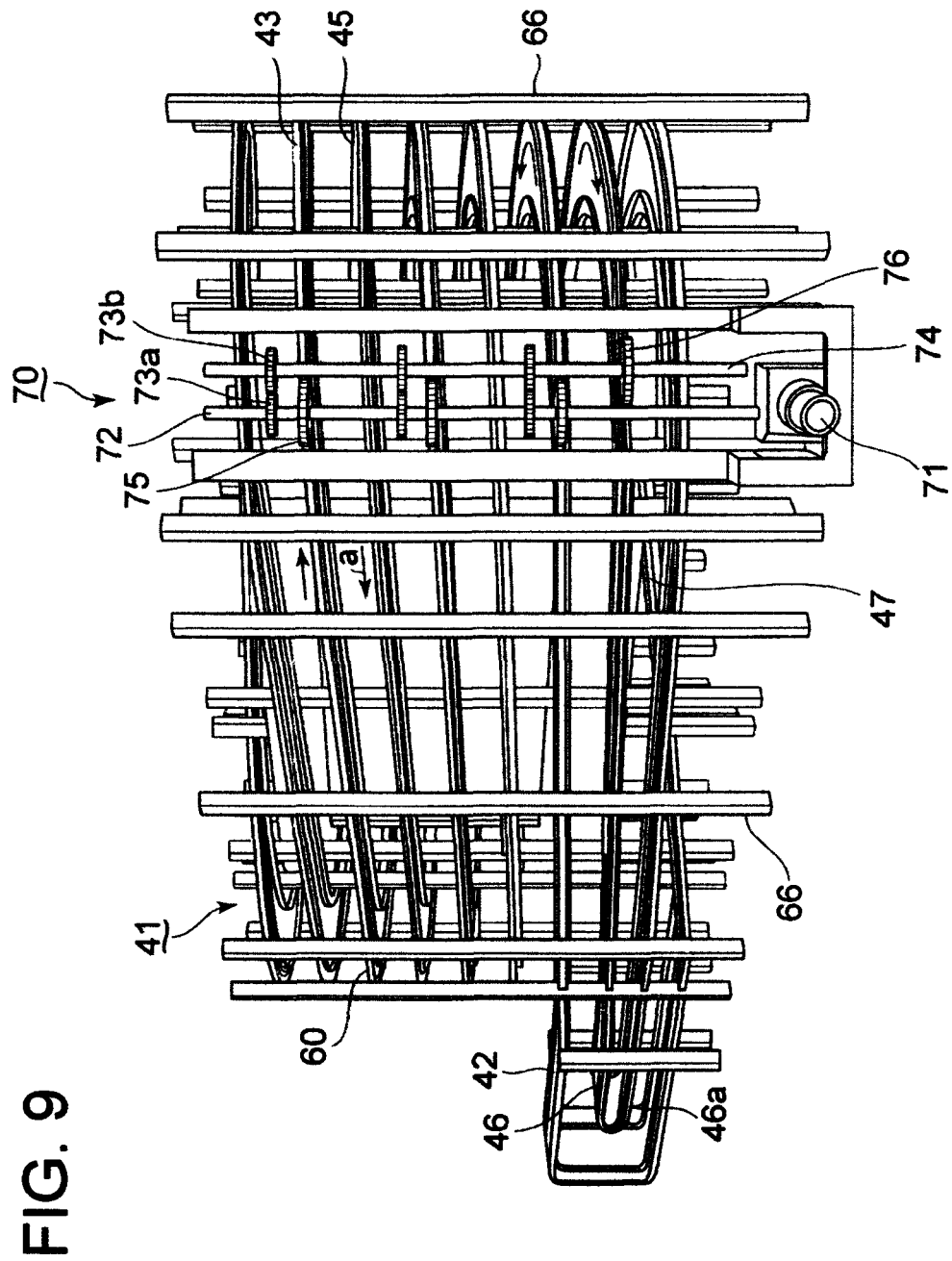
FIG. 9 shows a perspective view from a backside of the spiral freezer in FIG. 8.
Figure 10:
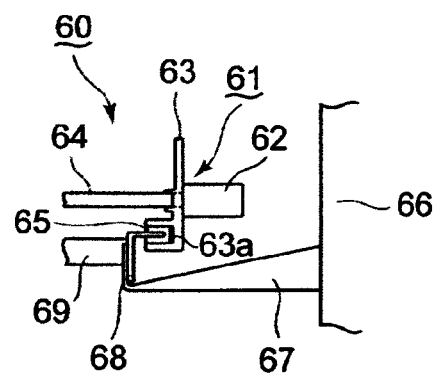
FIG. 10 shows an enlargement of a part of in FIG. 8.

The first embodiment of the second invention is now explained based on FIGS. 8 to 10. FIG. 8 shows a perspective view from a front side of a spiral freezer, according to the first embodiment of the second invention, and FIG. 9 shows a perspective view from a backside of the spiral freezer in FIG. 8. It is noted that the storeroom that houses the spiral transfer route to form a closed space is not shown in FIGS. 8 and 9.

As shown in FIGS. 8 and 9, a spiral transfer route 41 of a spiral freezer 40 comprises a lower inlet transfer route 42, a spiral upward route 43, a turnaround route 44, a spiral downward route 45, and a lower outlet transfer route 46. The lower inlet transfer route 42 is placed in a level plane, and connected to the spiral upward route 43 that is spirally arranged so as to surround a freezing unit 51 and a pair of distribution ducts 52 placed on both sides of the freezing unit 51.

The upper end of the spiral upward route 43 is connected to the turnaround route 44 forming a S-shaped route. The S-shaped turnaround route 44 reverses the route itself in a S-shaped locus, in an upper space over the freezing unit 51, so as to be connected to the spiral downward route 45. The spiral downward route 45 spirally descends between the vertically adjacent layers of the spiral upward route 43, so as to be connected to the lower outlet transfer route 46, at the lower end of the spiral transfer route 41.

The lower outlet transfer route 46 is placed below the lower inlet transfer route 42 so that both routes are parallel to each other in level planes. The lower outlet transfer route 46 leads to the lower inlet transfer route 42 via a loop-back route 46a that is a return route of the lower outlet transfer route 46 and is placed below the route 46, and a turnaround route 47 that is formed below the freezing unit 51. Thus, an endless transfer route (an endless transfer belt) 60 is formed along the above-described element routes that the spiral transfer route 41 comprises.

As is the case with the first embodiment in the first invention, inside of the spiral transfer route 41, the freezing unit 51 and the distribution ducts are arranged. Each of the spiral upward route 43 and the spiral downward route 45 comprises a straight part 41a toward which a plurality of hollow nozzles 53 protrudes from the outside face of the distribution ducts 52. The configuration of the hollow nozzle 53 is the same as that of the hollow nozzle 14 depicted in FIG. 5(B). The hollow nozzle 53 is provided with a vent 54 of a slit shape as the hollow nozzle 14 is provided with the vent 14b. Thus, the cooled air generated by the freezing unit 51 is supplied to the hollow nozzle 53 via the distribution ducts 52, and the cooled air supplied to the hollow nozzle 53 gushes down toward the transfer belt 60 through the vent 54.

The food f transferred on a conveyer 48 along the arrow direction is passed onto the lower inlet transfer route 42, to be transferred, along the direction of the arrow "a", on the spiral upward route 43, the turnaround route 44 that forms a S-shape route, the spiral downward route 45, the lower outlet transfer route 46, and the turnaround route 47, in sequence. A freezing treatment of the food f is performed in such a manner that the cooled air blows against the food f while the food f is being conveyed on the spiral upward route 43 and the spiral downward route 45. The food f that has been transferred on the lower outlet transfer route 46 is shifted onto a conveyer 49, and delivered to a next manufacturing process. The cooled air that gushes down through the vent 54 of a slit shape is inhaled through the suction opening of at least one blower 55 after freezing the food f, and the cooled air returns back to the freezing unit 51. Thus, a circulation of the cooled air is formed.

Around the spiral transfer route 41, a plurality of support struts 66 for the endless transfer belt 60 is installed upright. The structure for supporting the transfer belt 60 is now explained based on FIG. 10. In the drawing, the endless transfer belt 60 comprises a plurality of coupling elements (a series of adjacent links) 61 for the conveyer belt that are connected in series in the transfer direction. The coupling element 61 is provide with an appendage member 62 protruding outside of the transfer belt 60, and a lateral member 63 that is installed upright so as to define the limit of the transfer belt plane (zone) from the outside of the zone. The lateral member 63 is made of resin and having a recess part 63a for fitting a rail 68. The coupling element further includes a plurality of conveyer rods 64 that forms the transfer belt plane. The coupling elements 61 are connected in series so that the transfer belt can travel in a winding route, and the series of the elements 61 is able to bend left and right from a straight line.

The strut 66 includes;
a support bracket 67 that is horizontally fixed to the strut 66, facing to a support bracket that is placed on the opposite side over the endless transfer belt 60,
a rail 68 having a L-shaped cross section, fitted into the recess part 63a of lateral member 63 and supported by the support bracket 67, and
a beam 69 bridging the bracket 67 and the bracket on the opposite side of the bracket 67 over the endless transfer belt 60.

The tip part of the rail 68 is covered with a covering material 65 made of resin, such that the covering material is fitted into the recess part 63a so as to slidable contact the recess part. Thus, the endless transfer belt 60 is supported and guided by the rail 68, and the transfer belt can travel along the transfer routes. In this way, the endless transfer belt 60 is arranged so as to pass through the space between the hollow nozzles, without keeping contact with the distribution duct 52 and the hollow nozzle 53.

Next, the drive mechanism for the endless transfer belt 60 is explained with reference to FIG. 9. As shown in FIG. 9, a drive device 70 includes:
a drive motor 71 placed at a position near to the floor;
a drive shaft 72 installed upright and rotated by the drive motor;
a driven shaft 74 installed upright adjacent to the drive shaft 72, the driven shaft 74 being driven and rotated by the drive motor 71 via the drive shaft 72 and a pair of meshing gears 73a and 73b;
a plurality of sprockets 75 that are securely installed on the drive shaft 72; and
a plurality of sprockets 76 that are securely installed on the driven shaft 74.

The sprockets 75 that are securely installed on the drive shaft 72 mesh with the appendage members 62 of the endless transfer belt 60 (in FIG. 10) on the spiral upward route 43 so as to transmit the drive power of the drive shaft 72 to the endless transfer belt 60. The transfer belt 60 travels upward on the spiral upward route 43. On the other hand, the sprockets 76 that are securely installed on the driven shaft 74 mesh with the appendage members 62 of the endless transfer belt 60 (in FIG. 10) on the spiral downward route 45 so as to transmit the drive power of the driven shaft 74 to the endless transfer belt 60. The transfer belt 60 travels upward on the spiral downward route 45.

According to the first embodiment of the second invention as described above, the cooled air gushes vertically downward through the slip shaped vent 54 of the hollow nozzle 53 toward the food f. Thanks to the jet of this cool air, a film flow of the cool air is formed over the surface of the food to be in closer touch with the surface of the food f. Thus, a high efficiency of the heat exchange between the food f and the cool air can be achieved, enabling the food f to be frozen quickly. It is to be noted that the cooling effect due to the first embodiment of the second invention is as great as that due to the first or second embodiment of the first invention.

Further, in this first embodiment of the second invention, the endless transfer belt 60 that comprises spiral transfer route 41 is supported by the rails 68 that bridge a support bracket 67 of a strut 66 and a next bracket 67 of a next strut 66. The positioning for the endless transfer belt 60 is determined by the arrangement of the rails 68 and the struts 66. Hence, by means of a simple support mechanism, the endless transfer belt 60 is arranged so as to pass through the space between the hollow nozzles, without keeping contact with the distribution duct 52 and the hollow nozzle 53. In this way, the arrangement of a cooling air generating device comprising the freezing unit 51, the distribution ducts 52 and the hollow nozzles 53 can be determined independently of the arrangement of the spiral transfer route 41. Thus, interference between both arrangements (layouts) can be avoided, and each of the layouts can be designed independently of the other layout. Further, each of the layouts can be manufactured independently of the other layout, and both of the independently manufactured layouts can be assembled. Thus, the degree of freedom of the layouts can be increased, as well as the degree of precision as to the assembling processes can be relieved. Thus, the assembly or installation as to the whole device can be made easier.

Further, in this first embodiment of the second invention, the turnaround route 44 is provided in the upper space over the freezing unit 51 so that the spiral upward route 43 is reversed into the spiral downward route 45. The spiral upward route 43 and the spiral downward route 45 are repeated in turns along the vertical direction as if both the routes form a laminated configuration that alternates the upward and downward layers in one layer after another. Thus, within a limited footprint for the storeroom, the length of the endless transfer route 60 can be prolonged. Accordingly, the cooling effect for the food f can be further enhanced.

Moreover, the lower outlet transfer route 46 and the lower inlet transfer route 42 are arranged vertically parallel to each other, so that the total space for the food entrance and the food outlet is compactly arranged. The food f is brought in the spiral freezer 40 via the lower inlet transfer route 42, and brought out outside via the lower outlet transfer route 46. Therefore, the bring-in and bring-out operation of the food f can be smoothly performed. Further, the transfer route follows from the lower outlet transfer route 46, to the lower inlet transfer route 42, via the loop-back route 46a as well as via the turnaround route 47 that is disposed below the freezing unit 51. Thus, the communication from the lower outlet transfer route 46 to the lower inlet transfer route 42 can be compactly realized by use of the space below the freezing unit 51.

In addition, as the drive device 70 is provided, the reverse transfer movements between the spiral upward route 43 and the spiral downward route 45 can be realized with a simple mechanism.

(Fourth Aspect)

Figure 11:
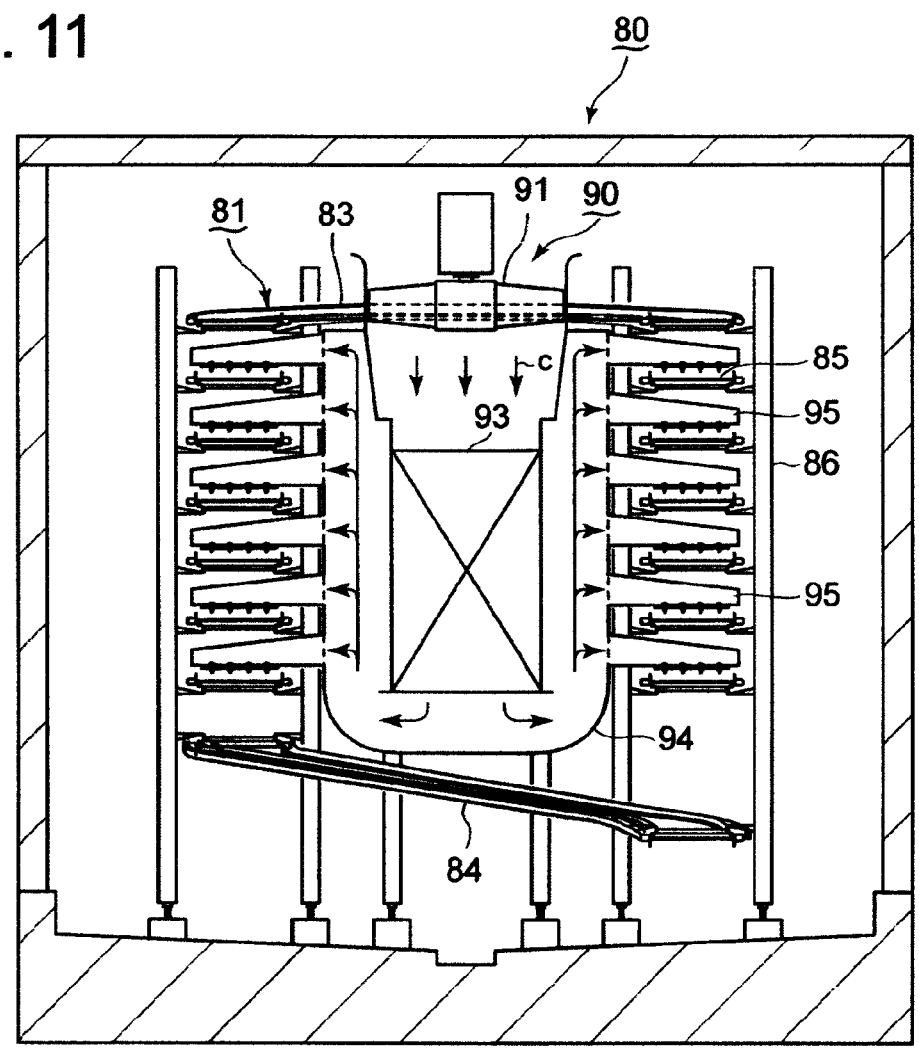
FIG. 11 shows a cross-section seen from a front side, according to second embodiment of the second invention.
Figure 12:
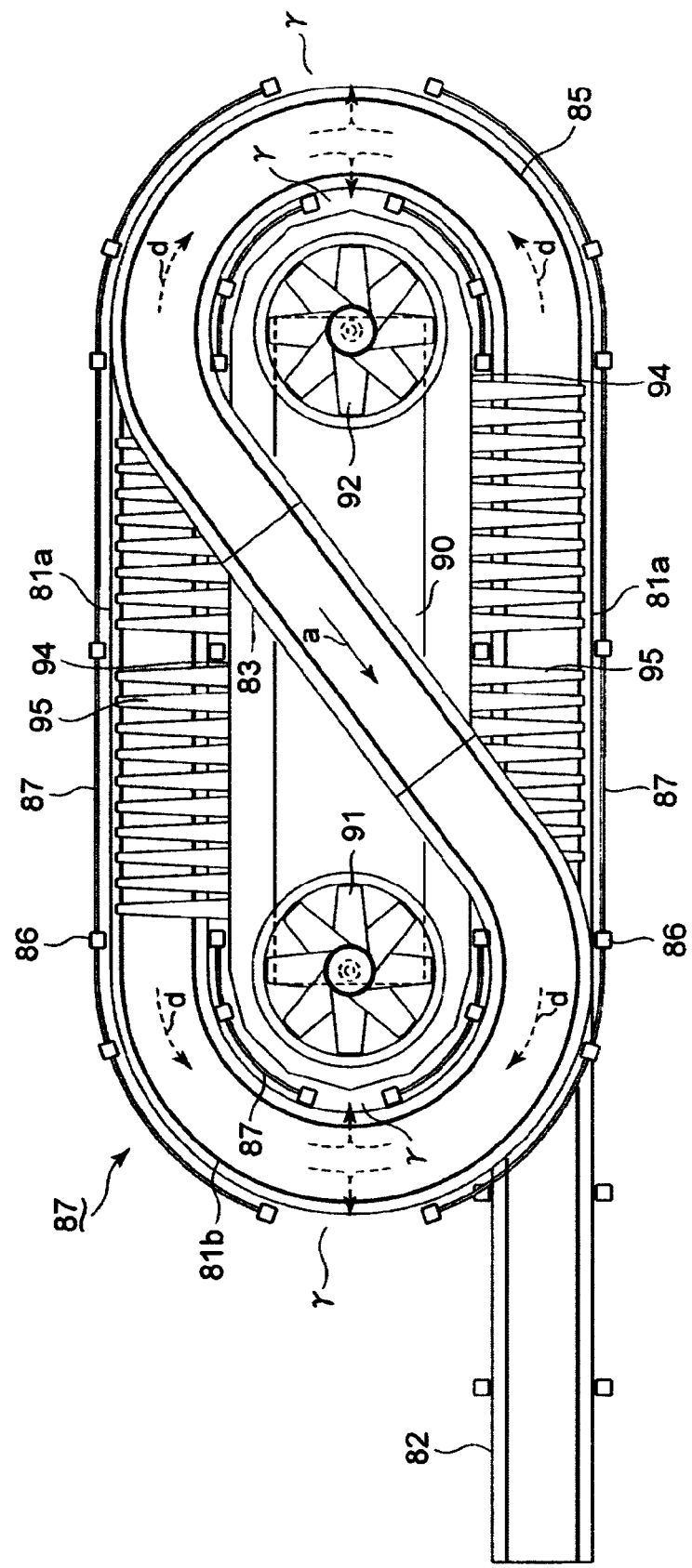
FIG. 12 shows a plan view of the spiral freezer in FIG. 11.

In the next place, the second embodiment of the second invention is now explained based on FIGS. 11 and 12. As shown in FIGS. 11 and 12, in a freezer (a freezing storeroom) 80 of a closed structure, a spiral transfer route 81 is formed. The spiral transfer route 81 comprises;

a lower inlet transfer route 82 that is arranged in a level plane;

a spiral upward route (not shown) that is connected to the lower inlet transfer route 82, forming a spiral upward way;

a S-shaped turnaround route 83 that is placed above a freezing unit 90, being connected to the end of the spiral upward route so as to reverse the upward way into the downward way;

a spiral downward route 84 that is connected to the S-shaped turnaround route 83, forming a spiral downward way so that the spiral upward route and the spiral downward route form double helical routes traveling in reverse directions;

a lower outlet transfer route (not shown) that is arranged below the lower inlet transfer route 82 in a direction parallel to the direction of the lower inlet transfer route;

a connection route (not shown) that is arranged below the freezing unit 90 and communicates with the lower outlet transfer route as well as the lower inlet transfer route 82 so as to make a loop-back route that reverses the lower outlet transfer route into the lower inlet transfer route 82.

The configuration of the spiral transfer route 81 is the same as that of the first embodiment of the second invention.

An endless transfer belt 85 constituting the spiral transfer route 81 is supported by a plurality of struts 86. The endless transfer belt 85 is arranged without keeping contact with a later described distribution duct 94 and a later described hollow nozzle 95. The supporting mechanism of the endless transfer belt 85 in this aspect (Fourth Aspect) is the same as that in Third Aspect. In addition, the drive device for driving the endless transfer belt 85 is the same as the drive device 70 in Third Aspect.

Inside the spiral transfer route 81 is placed a freezing unit 90. The freezing unit 90 is provided with a pair of blowers 91 and 92 at the uppermost space inside the spiral route 81. Each blower 91, 92 forms a cool air stream c (FIG. 11) that flows downward along the vertical axis through the center of the oval track. A heat exchanger 93 is installed below each of the blowers 91 and 92. The cooling air cis cooled by the heat exchanger to be discharged downward from the heat exchanger 93 into a distribution duct 94, then distributed in the distribution duct 94.

The outer side face of each branched distribution duct part (the outer side line parts of the U-shape in FIG. 11) 94 forms a plane that faces the spiral transfer route 81. The spiral transfer route 81 has a straight part 81a in correspondence with the plane. From the outer side face of the branched distribution duct part 94 toward the straight part 81a of the transfer belt 85, a number of hollow nozzles 95 of a tubular shape protrude, as a number of sticks protrude from a handle of a hairbrush. As shown in FIGS. 11 and 12, the hollow nozzle 95 may have a tapered tubular shape. The cross section thereof may be of a square, a circle, or ellipse. Or the hollow nozzle may not be tapered, having a circular cross section as shown in FIG. 13.

Figure 13:
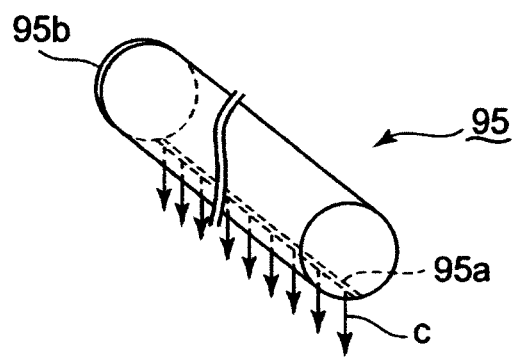
FIG. 13 shows a perspective view of a configuration example of a hollow nozzle that is used for the spiral freezer in FIG. 11.

The hollow nozzle 95 shown in FIG. 13 is provided with a vent 95a of a slit shape, having a perforation at the lower part of the nozzle 95 extending along the direction of the tubular nozzle axis. A male thread part 95b is provided at the root of the hollow nozzle 95. On the outer side face of each branched distribution duct part 94, a plurality of threaded holes (not shown) are provided so that the hollow nozzles 95 are fixed to the branched distribution duct part 94 by screwing-in the male thread part 95 into the thread hole. As a matter of course, instead of the before-described screw-in mechanism, a fitting mechanism by use of an attachable/detachable fitting part such as the fitting part 14f as shown in FIG. 5(A) or FIG. 5(B) and the corresponding perforated hole on the surface of the branched distribution duct part 94 may be adapted, so that the hollow nozzle can be fitted to the branched distribution duct part 94 with one-touch operation.

Further, the branched distribution duct part may be provided with spare threaded holes to fix the hollow nozzles 95 on the outer side face of branched distribution duct part in order that the fitting positions for the hollow nozzles can be appropriately changed or selected. In this way, the flow rate of the cooled air can be adjusted depending on the kind of the food f.

Outside the straight part 81a of the transfer route 81, a plurality of guide plates 87 are installed upright. The stream of the cooled air c after having gushed from the hollow nozzle 95 and collided with the food f is blocked by the guide plates 87, and the blocked air stream along the inner surface of the guide plates to become a stream d streaming toward each of the half-round arc parts 81b. Although the arc parts 81b is formed on each side of the straight part 81a, the hollow nozzle is not provided at each of the half-round parts 81b. Accordingly, the cooling effect is a bit weak around the each of the half-round parts 81b. In order to compensate this disadvantage, along both the outer edge side and the inner edge side of the endless transfer belt 85 at each of the half-round parts 81b except the neighborhood area r of the middle point of the half round of each arc part, a plurality of guide plates 87 is provided.

Thus, the cooled air c after having gushed from the hollow nozzle 95 and collided with the food f on the transfer belt 85 is guided by the outer side surface of the distribution duct 94 and the guide plates 87, while the cooled air f forms a stream d toward the half-round arc part 81b along the transfer belt plane. In this way, the formed cooled air stream d contributes to the cooling of the food f while being conveyed on the half-round arc part 81b. In the neighborhood area r of the middle point of the half round of each half-round arc part 81b, the guide plates are not provided. Thus, the cooled air streams into either of the inner side or the outer side of the transfer belt in the area r.

In the neighborhood of the inner side region of the area r, the blower 91 or 92 is placed so that the cooled air c flowing into the neighborhood of the inner side region of the area r is inhaled into the freezing unit 90 via the blower 91 or 92 to be re-cooled in the heat exchanger 93. The cooled air c flowing into the neighborhood outside of the area r circulates in the freezing storeroom 80, and contributes to the cooling of the whole inner space of the freezing storeroom 80. In this way, although the hollow nozzle 95 is not provided at each of the half-round parts 81b, the cooled air c that has been ejected from the hollow nozzles 95 provided at the straight part 81a of the spiral transfer route 81 is guided by the guide plates 87 so as to flow into the half-round arc part 81b, thus the cooling effect at the arc part 81b can be also ensured.

The hollow nozzles 95 may be provided at each of the half-round parts 81b. In this aspect (Fourth Aspect), the spiral transfer route comprises the spiral upward route and the spiral downward route traveling in the reverse direction of the spiral upward route. Hence, the outer side (in the belt-width direction) of the food f on the transfer belt 85 in the spiral upward route is reversed into the inner side of the food f on the transfer belt 85 in the spiral downward route. Therefore, even though the food f is cooled unevenly along the belt-width direction on the upward route, the cooling unevenness of the food f can be compensated on the downward route. Thus, according to the above described structure, the food f can be evenly cooled. Consequently, in a case where the hollow nozzles 95 (FIG. 13) of the tubular shape are provided at the half-round parts 81b, it is unnecessary to change the hollow nozzles 95 of the tubular shape into the hollow nozzles 32(FIG. 7) of a fan shape.

In this fourth aspect of the present invention, as is the case in the third aspect, an enhanced cooling effect on the cooling of the food f is achieved, as well as the arrangement of the cooling air generating device and the arrangement of the spiral transfer route 81 can be determined independently. Accordingly, the assembly of the cooling air generating device and the spiral transfer route 81 can be done after designing and manufacturing them independently. As a result, the easy assembly of the cool air generation device can be realized, the degree of freedom of the layouts can be increased, and the degree of precision of the assembling processes can be relieved. In this way, the assembly or installation as to the whole device can be made easier.

In addition to the above-described advantages, there is further advantage that the hollow nozzles 95 of a tubular type can be detachably connected to the distribution duct 94 at the outside surface with one touch operation. Further, with surplus thread holes provided on the outside surface of the distribution duct 94, the fitting locations of the hollow nozzles 95 can be selectively determined.

Further, thanks to the guide plates 87 provided at the half-round arc part 81b, a sufficient cooling effect can be also obtained at the arc part 81b where the hollow nozzles are not provided.

In addition, the guide plates 87 explained in this fourth aspect can be adopted in the third aspect of the present invention, since the spiral transfer route 41 in the third aspect includes the arc shaped part where the distribution duct is not provided. By providing the guide plate 87, the cooling effect can be made the same as that of the fourth aspect.

(Fifth Aspect)

Figure 14:
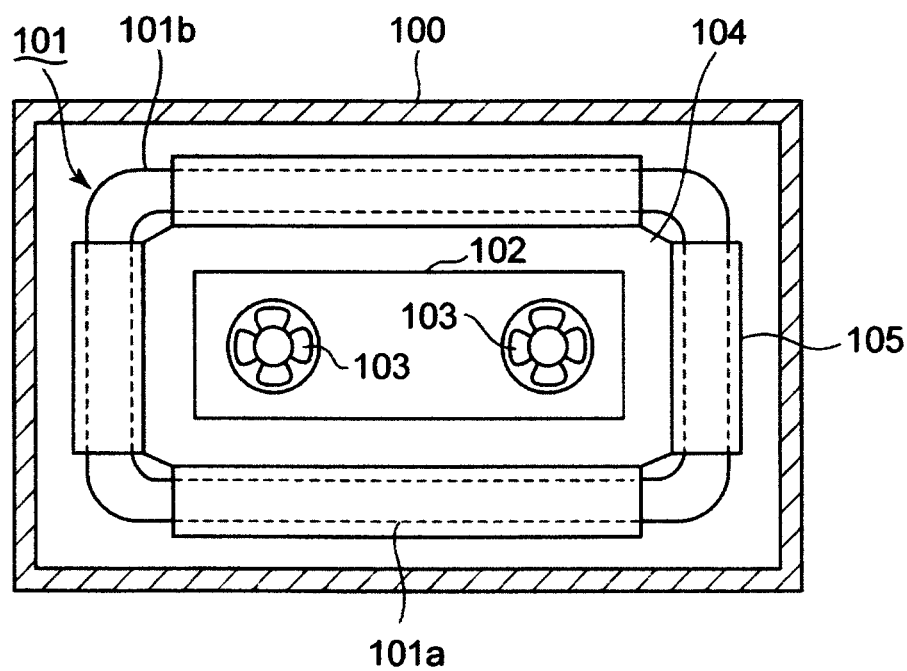
FIG. 14 shows a plan view of a spiral freezer, according to third embodiment of the first or second invention.
Figure 15:
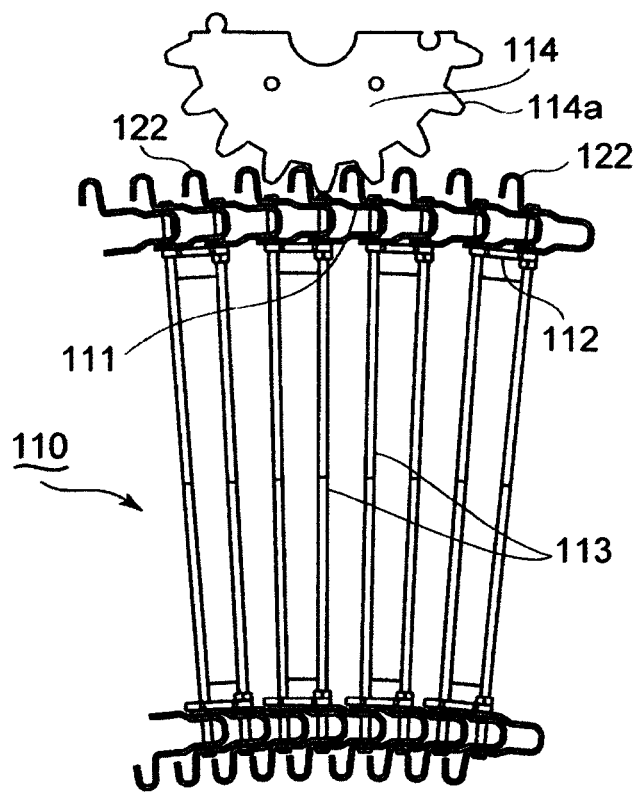
FIG. 15 shows a plan view of a configuration example of the conveyer belt.
Figure 16:
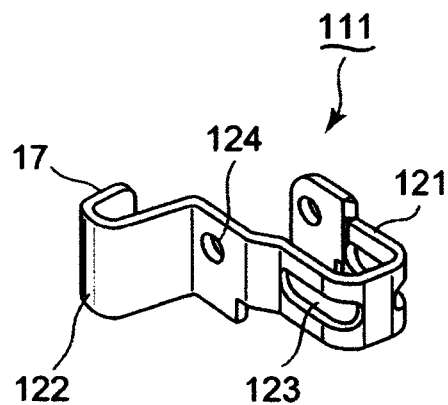
FIG. 16 shows a perspective view of a connecting link.

In the next place, the third embodiment of the first or second invention is now explained based on FIG. 14 that shows a plan view of a spiral freezer. As shown in FIG. 14, a spiral transfer route 101 is placed in an enclosed structured freezer (a freezing storeroom) 100 having a rectangular cross section. Inside the spiral transfer route 101 is arranged a freezing unit 102 that is provided with a pair of blowers 103 for circulating the cooled air cooled by the freezing unit 102 inside the freezing storeroom 100. Around the freezing unit 100, a distribution duct 104 is arranged so as to receive the cooled air that is cooled by the freezing unit 102.

The spiral transfer route 101 is configured to have a straight part 101a that is arranged each outside of the distribution duct 104, and an arc-shaped part (a quarter arc-shaped part) 101b that is arranged at each corner of the distribution duct. In this embodiment, the area of the arc-shaped part is reduced by reducing the curvature radius for the arc-shaped part, so as to increase the area of each straight part 101. A plurality of hollow nozzles 105 is provided, protruding outward from the outer side surface of the distribution duct 104. The basic configuration of the freezing unit 102, the distribution duct 104, the hollow nozzle 105 and the spiral transfer route 101 in this aspect is the same as the configuration in the first aspect, the third aspect or the fourth aspect.

According to the this fifth aspect of the invention, the area of the arc-shaped part in the spiral transfer route 101 is reduced by reducing the curvature radius for the arc-shaped part, while the area of each straight part 101 is increased. Thus, the spiral transfer route 101 is arranged so as to fit the shape of the freezing storeroom 100. Hence, within the limited space of the freezing storeroom 100, the length of the transfer belt of the spiral transfer route 101 can be prolonged, thereby the cooling effect can be increased and the space inside the freezing storeroom 100 can be effectively used.

In the case where the spiral transfer route 101 has not both of the spiral upward route and the spiral downward route but only an upward route, namely, in the case where one way transfer route is incorporated as in the first aspect of this invention, the present fifth aspect is effectively applicable so that the uneven cooling effect along the direction of the belt width can be reduced to a minimum, by increasing the area of the straight parts 101a.

INDUSTRIAL APPLICABILITY

According to a food heat treatment apparatus having an endless spiral conveyer belt of the present invention, the efficiency of the food heat treatment can be enhanced within a limited footprint, the degree of freedom as to the layout of the apparatus can be increased, the simplification as to the apparatus can be realized, and the drive power as to the apparatus can be reduced.

What is claimed is:

1. A spiral transfer heat-treatment apparatus comprising:
   a spiral transfer route formed in a storeroom so that food is heat-treated by heat-treatment-gas while transferring the food;
   a heat-treatment-gas generating device that is placed in a space inside the spiral transfer route; and
   at least one distribution duct that is placed between the heat-treatment-gas generating device and the spiral transfer route, the duct inhaling the heat-treatment gas generated by the heat-treatment-gas generating device,
   wherein the spiral transfer route includes:
   an endless transfer belt on which food is transferred; and
   a plurality of hollow nozzles that protrude from the distribution duct toward spaces between vertically successive loops of the endless transfer belt and support at least two rails, on which the endless transfer belt slides to move, with the upper surface of the hollow nozzles, the hollow nozzles ejecting the heat-treatment-gas toward the food transferred on the endless transfer belt below the hollow nozzles.

2. The spiral transfer heat-treatment apparatus according to claim 1, wherein the distribution duct includes:
   a gas receiving space that receives the heat-treatment-gas ejected from the hollow nozzles; and
   a plurality of perforations through which the heat-treatment-gas flows into the gas receiving space, on an outer surface of the distribution duct at a side facing the endless transfer belt,
   wherein the heat-treatment-gas flowing into the gas receiving space returns back to the heat-treatment-gas generating device.

3. The spiral transfer heat-treatment apparatus according to claim 1, further comprising:
   a gas receiving duct that receives the heat-treatment-gas ejected from the hollow nozzles, provided outside the spiral transfer route,
   wherein the gas receiving duct includes a plurality of perforations through which the heat-treatment-gas flows into the gas receiving duct, on an outer surface of the gas receiving duct, and
   wherein the heat heat-treatment-gas flowing into the gas receiving duct returns back to the heat-treatment-gas generating device.

4. The spiral transfer heat-treatment apparatus according to claim 2, further comprising:
   a gas receiving duct that receives the heat-treatment-gas ejected from the hollow nozzles, provided outside the spiral transfer route,
   wherein the gas receiving duct includes a plurality of perforations through which the heat-treatment-gas flows into the gas receiving duct, on an outer surface of the gas receiving duct, and
   wherein the heat heat-treatment-gas flowing into the gas receiving duct returns back to the heat-treatment-gas generating device.

5. The spiral transfer heat-treatment apparatus according to claim 1, wherein:
   the spiral transfer route includes a straight part and an arc-shaped part, and
   the arc-shaped part of the spiral transfer route is provided with a plurality of hollow nozzles having a fan shape that are configured so that the ejection area of the heat-treatment-gas from each of the fan-shaped hollow nozzles is broadened in the width direction of the endless transfer belt from inside to outside, the time span in which the food receives the blow of the heat-treatment-gas being kept constant regardless of the width direction position of the endless transfer belt.

6. The spiral transfer heat-treatment apparatus according to claim 1, further comprising a drive mechanism that includes:
   a drive motor provided outside of the spiral transfer route;
   a plurality of drive shaft installed upright, adjacent to the spiral transfer route, and driven by the drive motor; and
   a belt drive mechanism that transmits a drive torque of the drive shaft to the endless transfer belt to make the endless transfer belt slide on the rails toward a transfer direction.

7. The spiral transfer heat-treatment apparatus according to claim 1, further comprising a plurality of guide plates installed upright along each longitudinal side edge of an oval track of the spiral transfer route, the guide plates guiding the heat-treatment-gas ejected from the hollow nozzles toward the neighborhood of the gas inlet of the heat-treatment-gas generating device.

8. A spiral transfer heat-treatment apparatus comprising:
   a spiral transfer route formed in a storeroom so that the food is heat-treated by heat-treatment-gas while transferring the food;
   a heat-treatment-gas generating device that is placed in a space inside the spiral transfer route;
   at least one distribution duct that is placed between the heat-treatment-gas generating device and the spiral transfer route, the duct inhaling the heat-treatment gas generated by the heat-treatment-gas generating device; and
   a drive mechanism,
   wherein the spiral transfer route includes:
   an endless transfer belt on which food is transferred; and a plurality of hollow nozzles that protrudes from the distribution duct toward the space between vertically successive loops of the endless transfer belt without contact with the endless transfer belt, the hollow nozzles ejecting the heat-treatment-gas toward the endless transfer belt below or above the hollow nozzles, wherein the endless transfer belt includes:

a lower inlet transfer route that is arranged around a neighborhood of a space below the heat-treatment-gas generating device and the distribution duct;

a spiral upward route that is connected to the lower inlet transfer route, forming a spiral upward route along a traveling direction of the food to surround the heat-treatment-gas generating device and the distribution duct;

an S-shaped turnaround route that is connected to the spiral upward route and placed above the heat-treatment-gas generating device and the distribution duct, the S-shaped turnaround route forming a S-shaped curve route to reverse traveling direction of the food;

a spiral downward route that is connected to the S-shaped turnaround route, forming a spiral downward route along the traveling direction of the food; and a lower outlet transfer route that extends from the spiral downward route and arranged in a neighborhood of the lower inlet transfer route;

wherein the drive mechanism includes:

a drive motor that is provided outside of the spiral transfer route;

a drive shaft that is installed upright outside of the spiral transfer route adjacently, the drive shaft being driven by the drive motor;

a driven shaft that is installed upright adjacent to the drive shaft, the driven shaft being driven and rotated in a reverse rotation direction of the drive shaft by the drive shaft via a gear mechanism;

a first power transmission mechanism that transmits the drive torque of the drive shaft to the endless transfer belt at one of the spiral upward route or the spiral downward route; and a second power transmission mechanism that transmits the drive torque of the driven shaft to the endless transfer belt at the other of the spiral upward route or the spiral downward route, and wherein a spiral transfer rotation direction of the spiral upward route is opposite to that of the spiral downward route.

9. The spiral transfer heat-treatment apparatus according to claim 8, further comprising:

a plurality of support struts installed upright outside of the endless transfer belt; and at least one rail provided between the support struts to support the endless transfer belt so as to be slidable along the transfer route.

10. The spiral transfer heat-treatment apparatus according to claim 8, wherein:

the hollow nozzles are configured to have a tubular shape; and the hollow nozzles are arranged in multiple stages in vertical direction and arranged at equal intervals in each stage.

11. The spiral transfer heat-treatment apparatus according to claim 8, further comprising a plurality of guide plates installed upright along each longitudinal side edge of an oval track of the spiral transfer route, the guide plates guiding the heat-treatment-gas ejected from the hollow nozzles toward the neighborhood of an gas inlet of the heat-treatment-gas generating device.

\* \* \* \* \*